(12) United States Patent
Geng et al.

(10) Patent No.: US 10,004,027 B2
(45) Date of Patent: Jun. 19, 2018

(54) ACCESS CONTROL METHOD AND APPARATUS

(71) Applicant: Huawei Technologies Co., Ltd., Shenzhen (CN)

(72) Inventors: Tingting Geng, Shanghai (CN); Xiaoxiao Zheng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 140 days.

(21) Appl. No.: 14/930,339

(22) Filed: Nov. 2, 2015

(65) Prior Publication Data

US 2016/0057692 A1 Feb. 25, 2016

Related U.S. Application Data

(63) Continuation of application No. PCT/CN2013/083994, filed on Sep. 23, 2013.

(30) Foreign Application Priority Data

May 3, 2013 (WO) ................ PCT/CN2013/075147

(51) Int. Cl.
*H04W 4/00* (2018.01)
*H04W 48/02* (2009.01)
(Continued)

(52) U.S. Cl.
CPC ........... *H04W 48/02* (2013.01); *H04W 48/16* (2013.01); *H04W 88/02* (2013.01)

(58) Field of Classification Search
None
See application file for complete search history.

(56) References Cited

U.S. PATENT DOCUMENTS 8,478,286 B1 * 7/2013 Fan .................... H04W 72/0446
455/410
9,516,576 B2 * 12/2016 Lee ........................ H04W 76/02
(Continued)

FOREIGN PATENT DOCUMENTS

CN 1756405 A 4/2006
CN 101370251 A 2/2009
(Continued)

OTHER PUBLICATIONS

"$3^{rd}$ Generation Partnership Project; Technical Specification Group Radio Access Network; Radio Resource Control (RRC); Protocol specification (Release 11)," 3GPP TS 25.331, V11.5.0, pp. 1-2079, $3^{rd}$ Generation Partnership Project, Valbonne, France (Mar. 2013).

*Primary Examiner* — Michael J Moore, Jr.
(74) *Attorney, Agent, or Firm* — Leydig, Voit & Mayer, Ltd.

(57) ABSTRACT

Embodiments of the present disclosure provide an access control method and apparatus. The method includes: generating, by a network device, an access control message that includes an access control parameter, where the access control message is used to instruct user equipment to determine, according to the access control parameter after receiving the access control message, whether to initiate access, and the access control parameter includes an access control parameter based on a traffic class or an access control parameter based on an access class; and sending, by the network device, the access control message to the UE. The technical solutions of the present disclosure may reduce a signaling burden on a network and may enable the network device to provide more precise and flexible control of the UE.

18 Claims, 4 Drawing Sheets

(51) Int. Cl.
*H04W 48/16* (2009.01)
*H04W 88/02* (2009.01)

(56) References Cited

U.S. PATENT DOCUMENTS

| | | | | |
|---|---|---|---|---|
| 9,538,454 B2* | 1/2017 | Hwang | ................ | H04W 48/02 |
| 9,615,314 B2* | 4/2017 | Fong | ................... | H04W 48/12 |
| 9,655,029 B2* | 5/2017 | Fong | ................... | H04W 48/12 |
| 9,661,525 B2* | 5/2017 | Rajadurai | ........ | H04W 28/0289 |
| 9,763,170 B2* | 9/2017 | Lee | ...................... | H04W 48/06 |
| 2006/0035636 A1 | 2/2006 | Pirila | | |
| 2011/0201307 A1 | 8/2011 | Segura | | |
| 2012/0039171 A1* | 2/2012 | Yamada | .................. | H04L 47/12 |
| | | | | 370/232 |
| 2012/0307632 A1* | 12/2012 | Guo | ..................... | H04W 48/06 |
| | | | | 370/230 |
| 2013/0040605 A1* | 2/2013 | Zhang | .................. | H04W 48/06 |
| | | | | 455/411 |
| 2013/0281090 A1* | 10/2013 | Maeda | ................. | H04W 48/02 |
| | | | | 455/434 |
| 2014/0050141 A1 | 2/2014 | Ma et al. | | |
| 2014/0128029 A1* | 5/2014 | Fong | .................... | H04W 48/12 |
| | | | | 455/411 |
| 2014/0171061 A1* | 6/2014 | Larmo | .................. | H04W 48/18 |
| | | | | 455/422.1 |
| 2014/0370890 A1* | 12/2014 | Huang | .................. | H04W 48/02 |
| | | | | 455/434 |
| 2015/0036489 A1* | 2/2015 | Rajadurai | ......... | H04W 28/0205 |
| | | | | 370/230 |

FOREIGN PATENT DOCUMENTS

| | | |
|---|---|---|
| CN | 102655667 A | 9/2012 |
| CN | 102892177 A | 1/2013 |
| EP | 2205026 A1 | 7/2010 |
| EP | 2373110 A2 | 10/2011 |
| JP | 2004336814 A | 11/2004 |
| JP | 2009105758 A | 5/2009 |
| JP | 2009267438 A | 11/2009 |
| WO | WO 0152565 A2 | 7/2001 |
| WO | WO 2007017344 A1 | 2/2007 |
| WO | WO 2011100540 A1 | 8/2011 |
| WO | WO 2013020778 A1 | 2/2013 |
| WO | WO 2013023608 A1 | 2/2013 |
| WO | WO 2013025148 A1 | 2/2013 |
| WO | 2013141600 A1 | 9/2013 |

* cited by examiner

ACCESS CONTROL METHOD AND APPARATUS

CROSS-REFERENCE TO RELATED APPLICATIONS

This application is a continuation of International Patent Application No. PCT/CN2013/083994, filed on Sep. 23, 2013, which claims priority to International Patent Application No. PCT/CN2013/075147, filed on May 3, 2013, both of which are hereby incorporated by reference in their entireties

TECHNICAL FIELD

Embodiments of the present disclosure relate to communications technologies, and in particular, to an access control method and apparatus.

BACKGROUND

When a lot of user equipments (UE for short) simultaneously perform access or request services, congestion is caused due to access from a network side or insufficient service resources, or when the network side considers that it is necessary to prohibit access from some terminals or refuse to provide a service for some terminals, the network side may enable an access control mechanism to restrict the access from or service provided for the terminals.

As more UEs access a network, packet switching (PS for short) traffic of a small packet becomes more frequent, and a state of UE is also converted frequently, followed by an explosive increase of PS signaling. To reduce a signaling burden on the network, the PS traffic of the UE is generally set to be always-on, that is, the UE is configured to be in a cell paging channel (CELL_PCH for short) state or a registration area paging channel (URA_PCH for short) state. In this way, once the UE accesses the network, whether there is PS traffic or not, the UE is configured to be always-on, and initiation of the PS traffic is not restricted. Because network resources, for example, resources required by circuit switching (CS for short) traffic, are limited, a normal service of another UE is restricted, and therefore a more flexible access control mechanism needs to be introduced on the network side.

In the prior art, control is performed by using an access class barring (ACB for short) mechanism. When there is traffic congestion, to ensure that UE of each access class can fairly share system resources, an access control parameter needs to be frequently updated; and each time the access control parameter is updated, the UE needs to be first notified, by using a message named paging type 1 or a system message change indication, that a system message changes. However, when the network is congested, the signaling burden on the network may be further aggravated.

SUMMARY

Embodiments of the present disclosure provide an access control method and apparatus, which may reduce a signaling burden on a network and enable the network device to provide more precise and flexible control of the UE.

A first aspect of the present disclosure provides an access control method, including: generating, by a network device, an access control message that includes an access control parameter, where the access control message is used to instruct user equipment UE to determine, according to the access control parameter after receiving the access control message, whether to initiate access, and the access control parameter includes an access control parameter based on a traffic class or an access control parameter based on an access class; and sending, by the network device, the access control message to the UE.

In a first possible implementation manner of the first aspect, the traffic class includes a first traffic class and/or a second traffic class, where the first traffic class includes at least one of the following traffic classes: conversational traffic, streaming traffic, interactive traffic, background traffic, high-priority signaling, and low-priority signaling; and the second traffic class includes signaling transmission traffic and/or data transmission traffic, or the second traffic class includes common traffic and/or dedicated traffic.

According to the first possible implementation manner of the first aspect, in a second possible implementation manner of the first aspect, the signaling transmission traffic includes common control channel CCCH traffic and/or dedicated control channel DCCH traffic; the data transmission traffic includes dedicated data channel traffic DTCH; the common traffic includes a CCCH traffic; the dedicated traffic includes a DCCH traffic and/or a DTCH traffic.

With reference to the first aspect or any one of the first or the second possible implementation manner of the first aspect, in a third possible implementation manner of the first aspect, the access control parameter based on a traffic class is a mapping relationship between the traffic class and an access indication, and the access indication is used to indicate whether access is allowed for the traffic class.

With reference to the first aspect or any one of the first or the second possible implementation manner of the first aspect, in a fourth possible implementation manner of the first aspect, the access control parameter based on a traffic class is a mapping relationship between a traffic class corresponding to an access class of the user equipment and an access indication, and the access indication is used to indicate whether access is allowed for the traffic class corresponding to the access class of the user equipment.

With reference to the first aspect or any one of the first or the second possible implementation manner of the first aspect, in a fifth possible implementation manner of the first aspect, the access control parameter based on a traffic class is a mapping relationship between an originating traffic class and a terminating traffic class that are corresponding to a traffic class, and an access indication, and the access indication is used to indicate whether access is allowed for the originating traffic class and the terminating traffic class.

With reference to the first aspect or any one of the first or the second possible implementation manner of the first aspect, in a sixth possible implementation manner of the first aspect, the access control parameter based on a traffic class is a mapping relationship between a first traffic class corresponding to the second traffic class and an access indication, and the access indication is used to indicate whether access is allowed for the first traffic class corresponding to the second traffic class.

According to the first aspect, in a seventh possible implementation manner of the first aspect, the access control parameter based on an access class is a mapping relationship between an access class group of the user equipment and an access indication, and the access indication is used to indicate whether access is allowed for the access class group of the user equipment.

According to the first aspect, in an eighth possible implementation manner of the first aspect, the access control parameter based on an access class is a mapping relationship between an access class that is of user equipment and corresponding to an access class group and an access indication, and the access indication is used to indicate whether access is allowed for the access class of the user equipment.

With reference to the first aspect or any one of the first to the eighth possible implementation manners of the first aspect, in a ninth possible implementation manner of the first aspect, the generating, by a network device, an access control message that includes an access control parameter, where the access control message is used to instruct UE to initiate access according to the access control parameter after receiving the access control message includes: generating, by the network device, an access control message that includes an access control parameter and range indication information, where the access control message is used to instruct UE indicated by the range indication information to determine, according to the access control parameter after receiving the access control message, whether to initiate access.

According to the ninth possible implementation manner of the first aspect, in a tenth possible implementation manner of the first aspect, the range indication information is a group identifier of a user group in which the UE is located; and before the sending, by the network device, the access control message to the UE, the method further includes: sending, by the network device, user group information to the UE, where the user group information includes the group identifier of the user group in which the UE is located, or the user group information includes an identifier of the UE in the user group and the group identifier of the user group.

With reference to the first aspect or any one of the first to the tenth possible implementation manners of the first aspect, in an eleventh possible implementation manner of the first aspect, the access control message includes any one of: a broadcast message, a radio resource control RRC message, a paging message, and a system message change indication.

A second aspect of the present disclosure provides an access control method, including: receiving, by user equipment UE, an access control message sent by a network device, where the access control message includes an access control parameter, and the access control parameter includes an access control parameter based on a traffic class or an access control parameter based on an access class; and determining, by the UE according to the access control parameter, whether to initiate the access.

In a first possible implementation manner of the second aspect, the traffic class includes a first traffic class and/or a second traffic class, where the first traffic class includes at least one of the following traffic classes: conversational traffic, streaming traffic, interactive traffic, background traffic, high-priority signaling, and low-priority signaling; and the second traffic class includes signaling transmission traffic and/or data transmission traffic, or the second traffic class includes common traffic and/or dedicated traffic.

According to the first possible implementation manner of the second aspect, in a second possible implementation manner of the second aspect, the signaling transmission traffic includes common control channel CCCH traffic and/or dedicated control channel DCCH traffic; the data transmission traffic includes dedicated data channel traffic DTCH; the common traffic includes a CCCH traffic; the dedicated traffic includes a DCCH traffic and/or a DTCH traffic.

With reference to the second aspect or any one of the first or the second possible implementation manner of the second aspect, in a third possible implementation manner of the second aspect, the access control parameter based on a traffic class is a mapping relationship between the traffic class and an access indication, and the access indication is used to indicate whether access is allowed for the traffic class.

With reference to the second aspect or any one of the first or the second possible implementation manner of the second aspect, in a fourth possible implementation manner of the second aspect, the access control parameter based on a traffic class is a mapping relationship between a traffic class corresponding to an access class of the user equipment and an access indication, and the access indication is used to indicate whether access is allowed for the traffic class corresponding to the access class of the user equipment.

With reference to the second aspect or any one of the first or the second possible implementation manner of the second aspect, in a fifth possible implementation manner of the second aspect, the access control parameter based on a traffic class is a mapping relationship between an originating traffic class and a terminating traffic class that are corresponding to a traffic class, and an access indication, and the access indication is used to indicate whether access is allowed for the originating traffic class and the terminating traffic class.

With reference to the second aspect or any one of the first or the second possible implementation manner of the second aspect, in a sixth possible implementation manner of the second aspect, the access control parameter based on a traffic class is a mapping relationship between a first traffic class corresponding to the second traffic class and an access indication, and the access indication is used to indicate whether access is allowed for the first traffic class corresponding to the second traffic class.

According to the second aspect, in a seventh possible implementation manner of the second aspect, the access control parameter based on an access class is a mapping relationship between an access class group of the user equipment and an access indication, and the access indication is used to indicate whether access is allowed for the access class group of the user equipment.

According to the second aspect, in an eighth possible implementation manner of the second aspect, the access control parameter based on an access class is a mapping relationship between an access class that is of user equipment and corresponding to an access class group and an access indication, and the access indication is used to indicate whether access is allowed for the access class of the user equipment.

With reference to the second aspect or any one of the first to the eighth possible implementation manners of the second aspect, in a ninth possible implementation manner of the second aspect, the access control message further includes range indication information, and the range indication information is used to indicate a range of UEs to which the access control parameter is applicable; and the determining, by the UE according to the access control parameter, whether to initiate access includes: determining, by the UE according to the access control parameter and the range indication information, whether to initiate the access.

According to the ninth possible implementation manner of the second aspect, in a tenth possible implementation manner of the second aspect, the range indication information is a group identifier of a user group in which the UE is located; before the receiving, by UE, an access control message sent by a network device, the method further includes: receiving, by the UE, user group information sent by the network device, where the user group information includes the group identifier of the user group in which the UE is located, or the user group information includes an identifier of the UE in the user group and the group identifier of the user group; and the determining, by the UE according to the access control parameter and the range indication information, whether to initiate access includes: determining, by the UE, whether the UE belongs to the user group corresponding to a group identifier indicated by the access control message; and if the UE belongs to the user group corresponding to the group identifier indicated by the access control message, initiating, by the UE, access according to the access control parameter.

With reference to the second aspect or any one of the first to the tenth possible implementation manners of the second aspect, in an eleventh possible implementation manner of the second aspect, the access control message includes any one of: a broadcast message, a radio resource control RRC message, a paging message, and a system message change indication.

A third aspect of the present disclosure provides an access control apparatus, including: a generating module, configured to generate an access control message that includes an access control parameter, where the access control message is used to instruct user equipment UE to determine, according to the access control parameter after receiving the access control message, whether to initiate access, and the access control parameter includes an access control parameter based on a traffic class or an access control parameter based on an access class; and a sending module, configured to send the access control message to the UE.

In a first possible implementation manner of the third aspect, the traffic class includes a first traffic class and/or a second traffic class, where the first traffic class includes at least one of the following traffic classes: conversational traffic, streaming traffic, interactive traffic, background traffic, high-priority signaling, and low-priority signaling; and the second traffic class includes signaling transmission traffic and/or data transmission traffic, or the second traffic class includes common traffic and/or dedicated traffic.

According to the first possible implementation manner of the third aspect, in a second possible implementation manner of the third aspect, the signaling transmission traffic includes common control channel CCCH traffic and/or dedicated control channel DCCH traffic; the data transmission traffic includes dedicated data channel traffic DTCH; the common traffic includes a CCCH traffic; the dedicated traffic includes a DCCH traffic and/or a DTCH traffic.

With reference to the third aspect or any one of the first or the second possible implementation manner of the third aspect, in a third possible implementation manner of the third aspect, the access control parameter based on a traffic class is a mapping relationship between the traffic class and an access indication, and the access indication is used to indicate whether access is allowed for the traffic class.

With reference to the third aspect or any one of the first or the second possible implementation manner of the third aspect, in a fourth possible implementation manner of the third aspect, the access control parameter based on a traffic class is a mapping relationship between a traffic class corresponding to an access class of the user equipment and an access indication, and the access indication is used to indicate whether access is allowed for the traffic class corresponding to the access class of the user equipment.

With reference to the third aspect or any one of the first or the second possible implementation manner of the third aspect, in a fifth possible implementation manner of the third aspect, the access control parameter based on a traffic class is a mapping relationship between an originating traffic class and a terminating traffic class that are corresponding to a traffic class, and an access indication, and the access indication is used to indicate whether access is allowed for the originating traffic class and the terminating traffic class.

With reference to the third aspect or any one of the first or the second possible implementation manner of the third aspect, in a sixth possible implementation manner of the third aspect, the access control parameter based on a traffic class is a mapping relationship between a first traffic class corresponding to the second traffic class and an access indication, and the access indication is used to indicate whether access is allowed for the first traffic class corresponding to the second traffic class.

According to the third aspect, in a seventh possible implementation manner of the third aspect, the access control parameter based on an access class is a mapping relationship between an access class group of the user equipment and an access indication, and the access indication is used to indicate whether access is allowed for the access class group of the user equipment.

According to the third aspect, in an eighth possible implementation manner of the third aspect, the access control parameter based on an access class is a mapping relationship between an access class that is of user equipment and corresponding to an access class group and an access indication, and the access indication is used to indicate whether access is allowed for the access class of the user equipment.

With reference to the third aspect or any one of the first to the eighth possible implementation manners of the third aspect, in a ninth possible implementation manner of the third aspect, the generating module is further configured to generate an access control message that includes an access control parameter and range indication information, where the access control message is used to instruct UE indicated by the range indication information to determine, according to the access control parameter after receiving the access control message, whether to initiate the access.

According to the ninth possible implementation manner of the third aspect, in a tenth possible implementation manner of the third aspect, the range indication information is a group identifier of a user group in which the UE is located; and the sending module is further configured to: before sending the access control message to the UE, send user group information to the UE, where the user group information includes the group identifier of the user group in which the UE is located, or the user group information includes an identifier of the UE in the user group and the group identifier of the user group.

With reference to the third aspect or any one of the first to the tenth possible implementation manners of the third aspect, in an eleventh possible implementation manner of the third aspect, the access control message includes any one of: a broadcast message, a radio resource control RRC message, a paging message, and a system message change indication.

A fourth aspect of the present disclosure provides an access control apparatus, including: a receiving module, configured to receive an access control message sent by a network device, where the access control message includes an access control parameter, and the access control parameter includes an access control parameter based on a traffic class or an access control parameter based on an access class; and a processing module, configured to determine, according to the access control parameter, whether to initiate access.

In a first possible implementation manner of the fourth aspect, the traffic class includes a first traffic class and/or a second traffic class, where the first traffic class includes at least one of the following traffic classes: conversational traffic, streaming traffic, interactive traffic, background traffic, high-priority signaling, and low-priority signaling; and the second traffic class includes signaling transmission traffic and/or data transmission traffic, or the second traffic class includes common traffic and/or dedicated traffic.

According to the first possible implementation manner of the fourth aspect, in a second possible implementation manner of the fourth aspect, the signaling transmission traffic includes common control channel CCCH traffic and/or dedicated control channel DCCH traffic; the data transmission traffic includes dedicated data channel traffic DTCH; the common traffic includes a CCCH traffic; the dedicated traffic includes a DCCH traffic and/or a DTCH traffic.

With reference to the fourth aspect or any one of the first or the second possible implementation manner of the fourth aspect, in a third possible implementation manner of the fourth aspect, the access control parameter based on a traffic class is a mapping relationship between the traffic class and an access indication, and the access indication is used to indicate whether access is allowed for the traffic class.

With reference to the fourth aspect or any one of the first or the second possible implementation manner of the fourth aspect, in a fourth possible implementation manner of the fourth aspect, the access control parameter based on a traffic class is a mapping relationship between a traffic class corresponding to an access class of the user equipment and an access indication, and the access indication is used to indicate whether access is allowed for the traffic class corresponding to the access class of the user equipment.

With reference to the fourth aspect or any one of the first or the second possible implementation manner of the fourth aspect, in a fifth possible implementation manner of the fourth aspect, the access control parameter based on a traffic class is a mapping relationship between an originating traffic class and a terminating traffic class that are corresponding to a traffic class, and an access indication, and the access indication is used to indicate whether access is allowed for the originating traffic class and the terminating traffic class.

With reference to the fourth aspect or any one of the first or the second possible implementation manner of the fourth aspect, in a sixth possible implementation manner of the fourth aspect, the access control parameter based on a traffic class is a mapping relationship between a first traffic class corresponding to the second traffic class and an access indication, and the access indication is used to indicate whether access is allowed for the first traffic class corresponding to the second traffic class.

According to the fourth aspect, in a seventh possible implementation manner of the fourth aspect, the access control parameter based on an access class is a mapping relationship between an access class group of the user equipment and an access indication, and the access indication is used to indicate whether access is allowed for the access class group of the user equipment.

According to the fourth aspect, in an eighth possible implementation manner of the fourth aspect, the access control parameter based on an access class is a mapping relationship between an access class that is of user equipment and corresponding to an access class group and an access indication, and the access indication is used to indicate whether access is allowed for the access class of the user equipment.

With reference to the fourth aspect or any one of the first to the eighth possible implementation manners of the fourth aspect, in a ninth possible implementation manner of the fourth aspect, the access control message further includes range indication information, and the range indication information is used to indicate a range of UEs to which the access control parameter is applicable; and the processing module is further configured to determine, according to the access control parameter and the range indication information, whether to initiate access.

According to the ninth possible implementation manner of the fourth aspect, in a tenth possible implementation manner of the fourth aspect, the range indication information is a group identifier of a user group in which the UE is located;

the receiving module is further configured to: before receiving the access control message sent by the network device, receive user group information sent by the network device, where the user group information includes the group identifier of the user group in which the UE is located, or the user group information includes an identifier of the UE in the user group and the group identifier of the user group; and the processing module is further configured to:

determine, whether the UE belongs to the user group corresponding to a group identifier indicated by the access control message; and if the UE belongs to the user group corresponding to the group identifier indicated by the access control message, the UE initiates access according to the access control parameter.

With reference to the fourth aspect or any one of the first to the tenth possible implementation manners of the fourth aspect, in an eleventh possible implementation manner of the fourth aspect, the access control message includes any one of: a broadcast message, a radio resource control RRC message, a paging message, and a system message change indication.

A fifth aspect of the present disclosure provides a network device, including: a processor, configured to generate an access control message that includes an access control parameter, where the access control message is used to instruct user equipment UE to determine, according to the access control parameter after receiving the access control message, whether to initiate access, and the access control parameter includes an access control parameter based on a traffic class or an access control parameter based on an access class; and a transmitter, configured to send the access control message to the UE.

In a first possible implementation manner of the fifth aspect, the traffic class includes a first traffic class and/or a second traffic class, where the first traffic class includes at least one of the following traffic classes: conversational traffic, streaming traffic, interactive traffic, background traffic, high-priority signaling, and low-priority signaling; and the second traffic class includes signaling transmission traffic and/or data transmission traffic, or the second traffic class includes common traffic and/or dedicated traffic.

According to the first possible implementation manner of the fifth aspect, in a second possible implementation manner of the fifth aspect, the signaling transmission traffic includes common control channel CCCH traffic and/or dedicated control channel DCCH traffic; the data transmission traffic includes dedicated data channel traffic DTCH; the common traffic includes a CCCH traffic; the dedicated traffic includes a DCCH traffic and/or a DTCH traffic.

With reference to the fifth aspect or any one of the first or the second possible implementation manner of the fifth aspect, in a third possible implementation manner of the fifth aspect, the access control parameter based on a traffic class is a mapping relationship between the traffic class and an access indication, and the access indication is used to indicate whether access is allowed for the traffic class.

With reference to the fifth aspect or any one of the first or the second possible implementation manner of the fifth aspect, in a fourth possible implementation manner of the fifth aspect, the access control parameter based on a traffic class is a mapping relationship between a traffic class corresponding to an access class of the user equipment and an access indication, and the access indication is used to indicate whether access is allowed for the traffic class corresponding to the access class of the user equipment.

With reference to the fifth aspect or any one of the first or the second possible implementation manner of the fifth aspect, in a fifth possible implementation manner of the fifth aspect, the access control parameter based on a traffic class is a mapping relationship between an originating traffic class and a terminating traffic class that are corresponding to a traffic class, and an access indication, and the access indication is used to indicate whether access is allowed for the originating traffic class and the terminating traffic class.

With reference to the fifth aspect or any one of the first or the second possible implementation manner of the fifth aspect, in a sixth possible implementation manner of the fifth aspect, the access control parameter based on a traffic class is a mapping relationship between a first traffic class corresponding to the second traffic class and an access indication, and the access indication is used to indicate whether access is allowed for the first traffic class corresponding to the second traffic class.

According to the fifth aspect, in a seventh possible implementation manner of the fifth aspect, the access control parameter based on an access class is a mapping relationship between an access class group of the user equipment and an access indication, and the access indication is used to indicate whether access is allowed for the access class group of the user equipment.

According to the fifth aspect, in an eighth possible implementation manner of the fifth aspect, the access control parameter based on an access class is a mapping relationship between an access class that is of user equipment and corresponding to an access class group and an access indication, and the access indication is used to indicate whether access is allowed for the access class of the user equipment.

With reference to the fifth aspect or any one of the first to the eighth possible implementation manners of the fifth aspect, in a ninth possible implementation manner of the fifth aspect, the processor is further configured to generate an access control message that includes an access control parameter and range indication information, where the access control message is used to instruct UE indicated by the range indication information to determine, according to the access control parameter after receiving the access control message, whether to initiate access.

According to the ninth possible implementation manner of the fifth aspect, in a tenth possible implementation manner of the fifth aspect, the range indication information is a group identifier of a user group in which the UE is located; and the transmitter is further configured to: before sending the access control message to the UE, send user group information to the UE, where the user group information includes the group identifier of the user group in which the UE is located, or the user group information includes an identifier of the UE in the user group and the group identifier of the user group.

With reference to the fifth aspect or any one of the first to the tenth possible implementation manners of the fifth aspect, in an eleventh possible implementation manner of the fifth aspect, the access control message includes any one of: a broadcast message, a radio resource control RRC message, a paging message, and a system message change indication.

A sixth aspect of the present disclosure provides user equipment, including: a receiver, configured to receive an access control message sent by a network device, where the access control message includes an access control parameter, and the access control parameter includes an access control parameter based on a traffic class or an access control parameter based on an access class; and a processor, configured to determine, according to the access control parameter, whether to initiate access.

In a first possible implementation manner of the sixth aspect, the traffic class includes a first traffic class and/or a second traffic class, where the first traffic class includes at least one of the following traffic classes: conversational traffic, streaming traffic, interactive traffic, background traffic, high-priority signaling, and low-priority signaling; and the second traffic class includes signaling transmission traffic and/or data transmission traffic, or the second traffic class includes common traffic and/or dedicated traffic.

According to the first possible implementation manner of the sixth aspect, in a second possible implementation manner of the sixth aspect, the signaling transmission traffic includes common control channel CCCH traffic and/or dedicated control channel DCCH traffic; the data transmission traffic includes dedicated data channel traffic DTCH; the common traffic includes a CCCH traffic; the dedicated traffic includes a DCCH traffic and/or a DTCH traffic.

With reference to the sixth aspect or any one of the first or the second possible implementation manner of the sixth aspect, in a third possible implementation manner of the sixth aspect, the access control parameter based on a traffic class is a mapping relationship between the traffic class and an access indication, and the access indication is used to indicate whether access is allowed for the traffic class.

With reference to the sixth aspect or any one of the first or the second possible implementation manner of the sixth aspect, in a fourth possible implementation manner of the sixth aspect, the access control parameter based on a traffic class is a mapping relationship between a traffic class corresponding to an access class of the user equipment and an access indication, and the access indication is used to indicate whether access is allowed for the traffic class corresponding to the access class of the user equipment.

With reference to the sixth aspect or any one of the first or the second possible implementation manner of the sixth aspect, in a fifth possible implementation manner of the sixth aspect, the access control parameter based on a traffic class is a mapping relationship between an originating traffic class and a terminating traffic class that are corresponding to a traffic class, and an access indication, and the access indication is used to indicate whether access is allowed for the originating traffic class and the terminating traffic class.

With reference to the sixth aspect or any one of the first or the second possible implementation manner of the sixth aspect, in a sixth possible implementation manner of the sixth aspect, the access control parameter based on a traffic class is a mapping relationship between a first traffic class corresponding to the second traffic class and an access indication, and the access indication is used to indicate whether access is allowed for the first traffic class corresponding to the second traffic class.

According to the sixth aspect, in a seventh possible implementation manner of the sixth aspect, the access control parameter based on an access class is a mapping relationship between an access class group of the user equipment and an access indication, and the access indication is used to indicate whether access is allowed for the access class group of the user equipment.

According to the sixth aspect, in an eighth possible implementation manner of the sixth aspect, the access control parameter based on an access class is a mapping relationship between an access class that is of user equipment and corresponding to an access class group and an access indication, and the access indication is used to indicate whether access is allowed for the access class of the user equipment.

With reference to the sixth aspect or any one of the first to the eighth possible implementation manners of the sixth aspect, in a ninth possible implementation manner of the sixth aspect, the access control message further includes range indication information, and the range indication information is used to indicate a range of UEs to which the access control parameter is applicable; and the processor is further configured to determine, according to the access control parameter and the range indication information, whether to initiate access.

According to the ninth possible implementation manner of the sixth aspect, in a tenth possible implementation manner of the sixth aspect, the range indication information is a group identifier of a user group in which the UE is located; the receiver is further configured to: before receiving the access control message sent by the network device, receive user group information sent by the network device, where the user group information includes the group identifier of the user group in which the UE is located, or the user group information includes an identifier of the UE in the user group and the group identifier of the user group; and the processor is further configured to:

determine, whether the UE belongs to the user group corresponding to a group identifier indicated by the access control message; and if the UE belongs to the user group corresponding to the group identifier indicated by the access control message, initiate access according to the access control parameter.

With reference to the sixth aspect or any one of the first to the tenth possible implementation manners of the sixth aspect, in an eleventh possible implementation manner of the sixth aspect, the access control message includes any one of: a broadcast message, a radio resource control RRC message, a paging message, and a system message change indication.

According to the access control method and apparatus provided in the embodiments, a network device generates an access control message that includes an access control parameter, where the access control message is used to instruct UE to determine, according to the access control parameter after receiving the access control message, whether to initiate access; and sends the access control message to the UE, where the access control parameter includes an access control parameter based on a traffic class or an access control parameter based on an access class; and if the access control message in the embodiments is updated, the UE does not need to be notified, by using a paging type 1 or a system message change indication, that a SIB3 is updated, which may reduce a signaling burden on a network, and may enable the network device to provide more precise and flexible control of the UE.

BRIEF DESCRIPTION OF DRAWINGS

To describe the technical solutions in the embodiments of the present disclosure more clearly, the following briefly introduces the accompanying drawings required for describing the embodiments. Apparently, the accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present invention. Apparently, the described embodiments are some but not all of the embodiments of the present invention. All other embodiments obtained by persons of ordinary skill in the art based on the embodiments of the present disclosure without creative efforts shall fall within the protection scope of the present invention.

Technical solutions of embodiments of the present application are applicable to a variety of radio access networks, for example, an evolved Universal Mobile Telecommunications System (UMTS) terrestrial radio access network (E-UTRAN), a UMTS terrestrial radio access network (UTRAN), a Global System for Mobile Communications (GSM)/Enhanced Data rates for GSM Evolution (EDGE) radio access network (GERAN), and the like.

In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Figure 1:
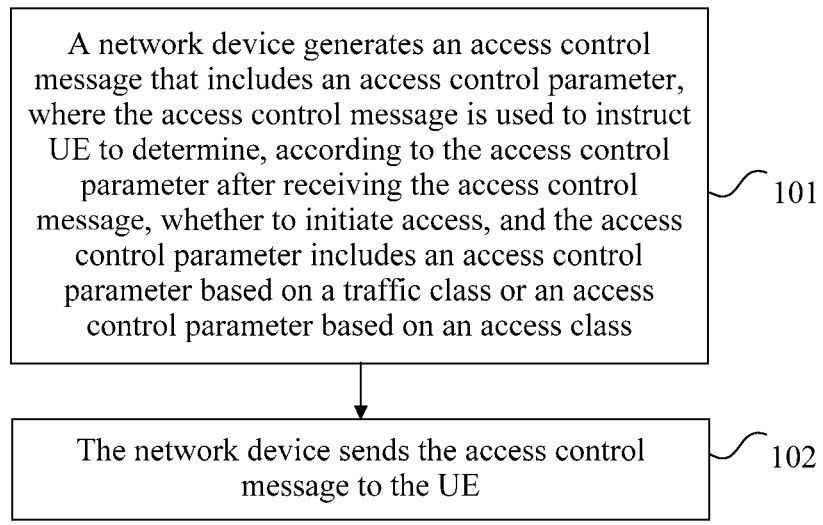
FIG. 1 is a flowchart of Embodiment 1 of an access control method according to the present invention.

FIG. 1 is a flowchart of Embodiment 1 of an access control method according to the present invention. As shown in FIG. 1, the access control method in this embodiment is described as follows:

S101. A network device generates an access control message that includes an access control parameter, where the access control message is used to instruct UE to determine, according to the access control parameter after receiving the access control message, whether to initiate access, and the access control parameter includes an access control parameter based on a traffic class or an access control parameter based on an access class.

The network device in this embodiment may be a device such as an evolved NodeB (eNB) or a home evolved NodeB (HeNB) in E-UTRAN, may be a radio network controller (RNC) in UTRAN, may be an base station controller (BSC) in GERAN, or may be a part of the devices; the UE in this embodiment may include but is not limited to user equipment such as a mobile phone, a personal digital assistant (PDA for short), a wireless handheld device, a wireless netbook, and a portable computer, or some of the user equipment.

The access in this embodiment may include any uplink behavior of the UE. For example, when being in an idle state, the UE initiates a radio resource control connection request, or when being in a cell forward access channel (CELL_FACH for short), CELL_PCH, or URA_PCH, the UE initiates signaling transmission and/or data transmission.

Specifically, when the UE is in an idle state, if the UE has uplink traffic to be transmitted, an initial direct transfer needs to be established first, and when the UE is not permitted to initiate a corresponding initial direct transfer, the UE does not need to initiate the radio resource control connection request; when the UE is in CELL_PCH or URA_PCH, if the UE has uplink traffic to be transmitted, the UE needs to initiate a cell update (CELL UPDATE) to request to convert the state to CELL_FACH, so as to initiate the foregoing traffic; or the UE is in a CELL_PCH state and has a valid high speed downlink shared channel radio network temporary identifier (H-RNTI for short), and when the UE has uplink traffic, the UE may initiate a measurement report (MR for short) whose measurement identifier is "16" to convert the state to CELL_FACH, so as to initiate the foregoing traffic; or if the UE is in a CELL_FACH state and if the UE has uplink traffic to be transmitted, the UE may directly initiate traffic transmission.

Further, if the UE in a CELL_PCH state or a URA_PCH state is not permitted to initiate the foregoing traffic transmission, the UE does not need to initiate the corresponding cell update (CU for short) or MR, either.

It may be understood that access determining needs to be performed according to specific access indication information to determine whether the UE is permitted to initiate the traffic.

Optionally, the traffic class may include a first traffic class and/or a second traffic class, where the first traffic class may include at least one of the following traffic classes: conversational traffic, streaming traffic, interactive traffic, background traffic, high-priority signaling, and low-priority signaling; and the second traffic class includes signaling transmission traffic and/or data transmission traffic, or the second traffic class includes common traffic and/or dedicated traffic.

Further, the signaling transmission traffic includes common control channel traffic (CCCH for short) and/or dedicated control channel traffic (DCCH for short); the data transmission traffic includes dedicated data channel traffic (DTCH for short); the common traffic includes a CCCH traffic; the dedicated traffic includes a DCCH traffic and/or a DTCH traffic.

For example, the CCCH traffic may be a radio resource control connection request (RRC Connection Request) or a CU; the DCCH traffic may be referred to as uplink RRC signaling initiated by the UE and the uplink RRC signaling may be an MR, a signaling connection release indication (SCRI for short), an uplink direct transfer (UDT for short), or user equipment capability information (UE Capability Information); the DTCH traffic may be referred to as uplink data traffic.

For example, the first traffic class may further include at least one of an emergency call, inter-RAT cell reselection, inter-RAT cell change, registration, detachment, and call re-establishment.

Specifically, the traffic class may include a traffic class that is of traffic and indicated by non-access stratum (NAS) of the UE, where the traffic needs to initiate a request, or a traffic class that is of traffic and corresponding to a radio connection bearer, where the radio connection bearer has been established by the UE, or a traffic class determined by the UE according to a logic channel type of initiated traffic, or a traffic class obtained by means of combining the foregoing determining manners.

Further, a scenario in which a traffic class of traffic to be initiated by the UE is indicated by the NAS of the UE may include two types. The first type is that: when the UE is in an idle state and has no connection to a network, in this case, the UE needs to initiate traffic, where a traffic class of the traffic is indicated by the NAS of the UE to an access layer, and the UE determines, according to information about the traffic class and with reference to the access control parameter based on a traffic class in this embodiment, whether access of the traffic class that is requested to be initiated is permitted. The second type is that: when the UE is in a connected mode and the UE has established a connection to the network, in an example in which a previous reason for establishing a connection is to initiate background traffic, if the UE needs to initiate conversational traffic this time, the NAS of the UE may indicate that traffic class initiated by the UE is conversational traffic.

A scenario in which a traffic class of traffic to be initiated by the UE is determined according to the traffic class corresponding to the radio connection bearer that has been established by the UE may include the following: when the UE is in a connected mode, and the UE has established a connection to a network, in an example in which a previous reason for establishing a connection is to initiate background traffic, after transmission of the background traffic ends, the UE is still in a connected mode, and if the UE needs to initiate background traffic again this time, the NAS of the UE no longer indicates the UE that the traffic class is background traffic, and therefore, the UE does not receive an indication from the NAS, and, by default, the traffic class of the traffic to be initiated this time is the same as the traffic class of the previously initiated traffic.

A scenario in which the UE determines a traffic class of to-be-initiated traffic according to the logic channel type of the initiated traffic may include the following: In an example in which a traffic class is signaling transmission traffic, if to-be-sent signaling needs to be sent on a CCCH or a DCCH, it may be determined that the traffic class of the to-be-initiated traffic is a CCCH or a DCCH; likewise, if a traffic class is data transmission traffic, and to-be-sent data needs to be sent on a DTCH, it may be determined that the traffic class of the to-be-initiated traffic is a DTCH.

The access control parameter based on a traffic class in this embodiment may include but is not limited to the following four types:

First type: The access control parameter based on a traffic class is a mapping relationship between the traffic class and an access indication, where the access indication is used to indicate whether access is allowed for the traffic class.

Specifically, the access control parameter based on a traffic class in this embodiment is used to indicate whether access of each traffic class is permitted (barred/not barred), or may not indicate other information, for example, domain information. For example, the access control parameter based on a traffic class may indicate that conversational traffic is not barred, streaming traffic is barred, and CCCH traffic is not barred, that is, neither conversational traffic nor CCCH traffic of CS and PS is barred, but streaming traffic is barred. Optionally, the access control parameter based on a traffic class may be separately configured based on a CS domain and/or a PS domain. For example, conversational traffic of the CS domain is configured to be not barred, and conversational traffic of the PS domain is configured to be barred.

For example, the foregoing first class of the access control parameter based on a traffic class may include any one in Table 1A to Table 1E.

TABLE 1A

| Traffic class | Access indication |
| --- | --- |
| Conversational traffic | Not barred |
| Streaming traffic | Barred |
| Interactive traffic | Not barred |
| Background traffic | Barred |
| High-priority signaling | Not barred |
| Low-priority signaling | Barred |

TABLE 1B

| Traffic class | Access indication |
| --- | --- |
| DCCH | Not barred |
| DTCH | Barred |

TABLE 1C

| Traffic class | Access indication |
| --- | --- |
| Conversational traffic | Not barred |
| Streaming traffic | Barred |
| Interactive traffic | Not barred |
| Background traffic | Barred |
| DCCH | Barred |
| DTCH | Not barred |
| Emergency call | Barred |
| Inter-RAT cell reselection | Not barred |

TABLE 1D

| Traffic class | Access indication |
| --- | --- |
| Conversational traffic and streaming traffic | Not barred |
| Interactive traffic and background traffic | Barred |

TABLE 1E

| Traffic class | Access indication |
| --- | --- |
| Conversational traffic, interactive traffic, and background traffic | Not barred |
| Streaming traffic | Barred |

Second type: The access control parameter based on a traffic class is a mapping relationship between a traffic class corresponding to an access class of the user equipment and an access indication, where the access indication is used to indicate whether access is allowed for the traffic class corresponding to the access class of the user equipment.

For example, the access control parameter based on a traffic class may also be a mapping relationship between traffic classes separately corresponding to access classes 0 to 15 of user equipment and access indications. For example, as shown in Table 2, Table 2 merely exemplarily lists a mapping relationship between four traffic classes corresponding to two access classes and access indications, and this embodiment is not limited thereto.

TABLE 2

| Access class | Traffic class | Access indication |
| --- | --- | --- |
| 1 | Conversational traffic | Not barred |
|   | Streaming traffic | Barred |
|   | Interactive traffic | Not barred |
|   | Background traffic | Barred |
|   | DTCH | Barred |
|   | DCCH | Barred |
| 2 | Conversational traffic | Barred |
|   | Streaming traffic | Barred |
|   | Interactive traffic | Not barred |
|   | Background traffic | Not barred |
|   | DTCH | Not barred |
|   | DCCH | Not barred |

Third type: The access control parameter based on a traffic class is a mapping relationship between an originating traffic class and a terminating traffic class that are corresponding to a traffic class, and an access indication, where the access indication is used to indicate whether access is allowed for the originating traffic class and the terminating traffic class.

For example, the access control parameter based on a traffic class may also be the mapping relationship between the originating traffic class and the terminating traffic class that are corresponding to the traffic class, and the access indication. For example, as shown in Table 3, Table 3 merely exemplarily lists a mapping relationship between access indications and originating traffic classes and terminating traffic classes that are corresponding to four traffic classes, and this embodiment is not limited thereto.

TABLE 3

| Traffic class | Call type | Access indication |
| --- | --- | --- |
| Conversational traffic | Originating | Not barred |
|   | Terminating | Barred |
| Streaming traffic | Originating | Barred |
|   | Terminating | Not barred |
| Interactive traffic | Originating | Not barred |
|   | Terminating | Barred |
| Background traffic | Originating | Barred |
|   | Terminating | Not barred |

Fourth type: The access control parameter based on a traffic class is a mapping relationship between a first traffic class corresponding to a second traffic class and an access indication, where the access indication is used to indicate whether access is allowed for the first traffic class corresponding to the second traffic class.

It may be understood that the access control parameter based on a traffic class may also be a mapping relationship between the second traffic class corresponding to the first traffic class and an access indication, and the access indication is used to indicate whether access is allowed for the second traffic class corresponding to the first traffic class.

For example, the fourth class of the access control parameter based on a traffic class may be an access control parameter based on a traffic class shown in Table 4.

TABLE 4

| Second traffic class | First traffic class | Access indication |
|---|---|---|
| DCCH | Conversational traffic | Not barred |
|  | Streaming traffic | Barred |
|  | Interactive traffic | Not barred |
|  | Background traffic | Barred |
| DTCH | Streaming traffic | Barred |
|  | Interactive traffic | Not barred |
|  | Background traffic | Not barred |
|  | Conversational traffic | Not barred |

Optionally, the traffic class may be any combined traffic class of the first traffic class and/or the second traffic class.

The foregoing traffic content is only exemplary, and the present disclosure is not limited thereto.

Optionally, the access control parameter based on an access class is a mapping relationship between an access class group of the user equipment and an access indication, and the access indication is used to indicate whether access is allowed for the access class group of the user equipment.

For example, for common UE, an access class of the UE is a value from 0 to 9; some terminals may have a special access class, that is, the access class may also be a value from 10 to 15, and a terminal with a special access class has a higher priority in some applications; therefore, the access control parameter based on an access class may be the mapping relationship between the access class group of the user equipment and the access indication. For example, access classes 0 to 3 are a first group, access classes 4 to 9 are a second group, access classes 10 to 15 are a third group, access indications of the first group and the second group are barred, and an access indication of the third group is not barred. The foregoing is merely exemplary, and an access class group of user equipment and an access indication of each group may be specifically configured according to an actual situation.

Optionally, the access control parameter based on an access class is a mapping relationship between an access class that is of user equipment and corresponding to an access class group and an access indication, and the access indication is used to indicate whether access is allowed for the access class of the user equipment.

For example, the access control parameter based on an access class may also be the mapping relationship between the access class that is of the user equipment and corresponding to the access class group of the user equipment and the access indication. For example, as shown in Table 5, a mapping relationship between an access class group and an access class is not limited, and one group has multiple access classes, which may save some bits. Table 5 merely exemplarily lists a mapping relationship between access classes that are of user equipment and corresponding to three access class groups and access indications, and this embodiment is not limited thereto.

TABLE 5

| Access class group | Access class | Access indication |
|---|---|---|
| First group | 0 | Barred |
|  | 1 |  |
|  | 2 |  |
|  | 3 |  |
| Second group | 4 | Not barred |
|  | 5 |  |
|  | 6 |  |
|  | 7 |  |
|  | 8 |  |
|  | 9 |  |
| Third group | 10 | Not barred |
|  | 11 |  |
|  | 12 |  |
|  | 13 |  |
|  | 14 |  |
|  | 15 |  |

In this embodiment, for the access control parameter based on an access class, if the UE receives the access control parameter based on an access class in the present invention, an access control parameter in a system information block (System Information Block, SIB for short) 3 in the prior art is ignored, and if the access control parameter based on an access class in this embodiment does not exist, the UE determines, according to the access control parameter in the SIB3 in the prior art, whether to initiate access.

In this embodiment, for the access control parameter based on a traffic class, the UE may determine, only according to an access control parameter that is based on a traffic class and corresponding to an originating traffic class/a terminating traffic class initiated by the UE, whether access is allowed for the UE That is, when the access control parameter based on a traffic class exists, the access control parameter in the SIB3 in the prior art is ignored, and when the access control parameter based on a traffic class does not exist, the UE determines, according to the access control parameter in the SIB3, whether to initiate access.

It may be understood that the UE may first determine, according to the access control parameter in the SIB3, whether access is allowed for an access class corresponding to the UE; if the access is allowed, then further determine whether an access indication corresponding to originating/terminating conversational traffic, streaming traffic, interactive traffic, background traffic, high-priority signaling, low-priority signaling, a DCCH, a DTCH, or the like to be initiated by the UE is not barred, and if the access indication corresponding to the originating/terminating conversational traffic, the streaming traffic, the interactive traffic, the background traffic, the high-priority signaling, the low-priority signaling, the DCCH, the DTCH, or the like to be initiated by the UE is not barred, initiate access; and if the access is not allowed for the access class corresponding to the UE, the UE no longer further performs determining on the access control parameter based on a traffic class and does not initiate access.

Alternatively, if access is not allowed for the access class corresponding to the UE, the UE then further determines whether originating/terminating conversational traffic, streaming traffic, interactive traffic, background traffic, high-priority signaling, low-priority signaling, DCCH, DTCH or the like to be initiated by the UE is not barred, and if the originating/terminating conversational traffic, the streaming traffic, the interactive traffic, the background traffic, the high-priority signaling, the low-priority signaling, or the like to be initiated by the UE is not barred, initiates access; and if the access is allowed for the access class corresponding to the UE, the UE initiates access and does not need to further determine the access control parameter based on a traffic class.

In this embodiment, for the access control parameter based on a traffic class, precise access control is performed on the access control parameter according to a traffic class; further, on a basis of traffic classes of a CS domain and a PS domain, access control parameters based on originating/terminating conversational traffic, streaming traffic, interactive traffic, background traffic, high-priority signaling, low-priority signaling, a DCCH, and a DTCH may further be configured; for the access control parameter based on an access class, access classes are grouped on a basis of the prior art, and an access control parameter is configured for each group, which may enable the network device to provide more precise and flexible control of the UE, and implement different access control according to traffic classes of UEs to ensure that traffic with a high priority preferentially uses a network resource.

S102. The network device sends the access control message to the UE.

It should be noted that an update of the access control message in this embodiment is different from an update of the access control parameter in the prior art. In the prior art, access control is performed on the UE by using ACB of the SIB3, and when there is traffic congestion, to ensure that UE of each access class may fairly share system resources, the access control parameter in the SIB3 needs to be frequently updated; each time the SIB3 is updated, the UE needs to be first notified, by using a paging type 1 or a system message change indication, that the SIB3 is updated, and in this way, when a network is congested, a burden on the network may be further aggravated instead. However, the access control message in this embodiment is used to instruct the UE to directly initiate access according to the access control parameter after receiving the access control message, and if the access control message in this embodiment is updated, the UE does not need to be notified, by using a paging type 1 or a system message change indication, that a SIB3 is updated, which may reduce a signaling burden on the network.

Optionally, the access control message may include a broadcast message, a radio resource control RRC message, a paging message, and a system message change indication.

For example, the broadcast message may include a master information block (Master Information Block) message, a scheduling block message, and a system information block message.

The radio resource control RRC message includes RRC messages such as a radio resource control connection setup message, a cell update confirm message, a Utran mobility information message, a radio bear setup/reconfiguration/release message, a physical channel reconfiguration message, and a transport channel reconfiguration message.

The broadcast message and the RRC message include but are not limited to the foregoing messages.

For example, the broadcast message may be a SIB7 or a newly defined SIB that is based on a timer. The SIB7 changes based on a timer, and a change frequency of the SIB7 is far greater than a change frequency of a SIB3; therefore, by using the SIB7 to carry the access control parameter, in one aspect, the network device may perform access control more timely on the UE according to a network resource status, and in another aspect, an update of the SIB7 does not cause an additional signaling overhead.

A newly defined SIB may change based on a timer, or may change based on a value tag. If the newly defined SIB changes based on a timer, the newly defined SIB and the SIB7 may generate a similar effect; if the new SIB changes based on a value tag, it is still required to notify, by using a message of paging type 1 or a system message change indication, the UE that a system message changes. An advantage is that for an old terminal, the UE cannot know that the newly defined SIB changes, and therefore, the UE does not need to read the system message, and only UE that supports the newly defined SIB needs to read the system message, which causes relatively low impact on a UE side.

By using a radio resource control RRC message, such as a UTRAN mobility information (Utran Mobility Information), to carry the access control parameter, access control on each UE or a group of UEs may be implemented, and access control may be performed more flexibly.

An updated access control parameter may be directly carried by using a paging message or a system message change indication, which avoids a frequent update of the SIB3, and when the UE is paged, an update to the access control parameter may be performed.

According to the access control method in this embodiment, a network device generates an access control message that includes an access control parameter, where the access control message is used to instruct UE to determine, according to the access control parameter after receiving the access control message, whether to initiate access; and sends the access control message to the UE, where the access control parameter includes an access control parameter based on a traffic class or an access control parameter based on an access class; and if the access control message in this embodiment is updated, the UE does not need to be notified, by using a paging type 1 or a system message change indication, that a SIB3 is updated, which may reduce a signaling burden on a network, and may enable the network device to provide more precise and flexible control of the UE.

Optionally, the access control parameter based on a traffic class or the access control parameter based on an access class may also be a mapping relationship between a traffic class or an access class and an access factor, where the access factor is used to determine whether access is allowed for the traffic class, and a value of the access factor ranges from 0 to 1.

Specifically, a UE side randomly generates a random factor, and a value of the random factor uniformly ranges from 0 to 1. If the random factor is less than or equal to the access factor, access is allowed for the UE, and if the random factor is greater than the access factor, access of the UE is not permitted; or if the random factor is less than or equal to the access factor, access of the UE is not permitted, and if the random factor is greater than the access factor, access is allowed for the UE.

Figure 2:
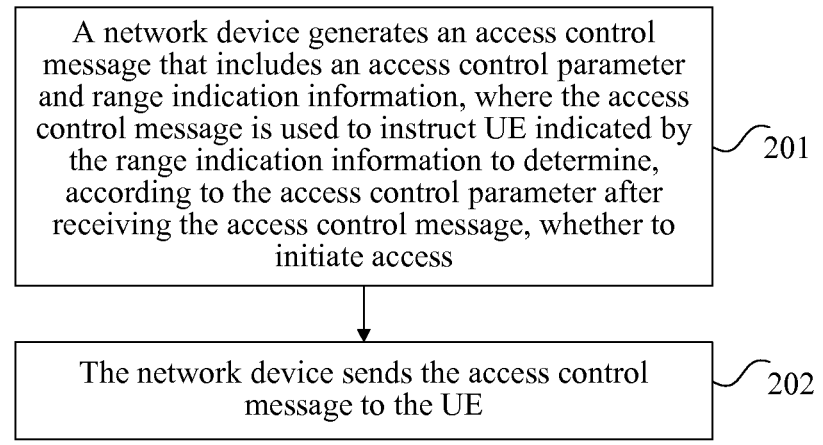
FIG. 2 is a flowchart of Embodiment 2 of an access control method according to the present invention.

FIG. 2 is a flowchart of Embodiment 2 of an access control method according to the present invention. As shown in FIG. 2, in the access control method in this embodiment, on a basis of the embodiment shown in FIG. 1, a network device further indicates, to UE, information about a range to which an access control parameter is applicable.

S201. The network device generates an access control message that includes the access control parameter and range indication information, where the access control message is used to instruct UE indicated by the range indication information to determine, according to the access control parameter after receiving the access control message, whether to initiate access.

For example, the range indication information may be used to indicate a range of UEs to which the access control parameter is applicable. For example, UEs may be classified to indicate which type of UE or which types of UE to which the access control parameter is applicable.

S202. The network device sends the access control message to the UE.

It should be noted that the range indication information of the access control parameter based on a traffic class may be that one traffic class is corresponding to one piece of range indication information, or may be that all traffic classes share one piece of range indication information.

According to the access control method in this embodiment, a network device generates an access control message that includes an access control parameter and range indication information, where the access control message is used to instruct UE indicated by the range indication information to determine, according to the access control parameter after receiving the access control message, whether to initiate access; and sends the access control message to the UE; and if the access control message in this embodiment is updated, the UE does not need to be notified, by using a paging type 1 or a system message change indication, that a SIB3 is updated, which may reduce a signaling burden on a network, and by means of indicating of the range indication information in this embodiment, more precise and flexible access control of the network device over the UE may be implemented.

In another possible implementation manner, a SIB3 in the prior art may be extended, and an extended SIB3 carries the range indication information on a basis of the SIB3 in the prior art. For UE that can identify the range indication information, when a value tag of the SIB3 changes, the UE reads the SIB3, and determines, according to whether the UE belongs to a group whose group identifier is indicated by the range indication information, whether the UE needs to update a stored access control parameter; for UE that cannot identify the range indication information, when a value tag of the SIB3 changes or a storage time of the SIB3 expires, the UE reads and updates the stored access control parameter, and the access control parameter and the range indication information are indicated to the UE by using the extended SIB3, which may implement more precise and flexible access control of the network device over the UE.

In Embodiment 3 of the access control method in this embodiment, the range indication information is a group identifier of a user group in which the UE is located. Before S201 in the embodiment shown in FIG. 2, the method further includes: sending, by the network device, user group information to the UE, where the user group information may include the group identifier of the user group in which the UE is located; or the user group information includes an identifier of the UE in the user group and the group identifier of the user group.

For example, the range indication information may be the group identifier of the user group in which the UE is located, that is, UEs are grouped to indicate a group to which an access control parameter is applicable.

For example, the range indication information may indicate that the access control parameter is applicable to only UE whose group identifier is corresponding to a value of the range indication information. For example a value 0 indicates that the access control parameter is applicable to only UE in group 0, a value 1 indicates being applicable to UE in group 1, and a value 2 indicates being applicable to UE in group 2. The range indication information may further indicate that the access control parameter is applicable to UE whose group identifier is corresponding to a value of the range indication information and UE whose group identifier priority is lower than or higher than a priority of a group identifier indicated by the range indication information. For example, a value 0 indicates that the access control parameter is applicable to only UE in group 0, a value 1 indicates that the access control parameter is applicable to only UEs in group 0 and group 1, and a value 2 indicates that the access control parameter is applicable to only UEs in group 0, group 1, and group 2.

For example, the network device may send a user group information to the UE by carrying the user group information in a radio resource control message. In an example in which the network device is an RNC, the RNC may indicate the user group information to the UE in the radio resource message such as an RRC connection setup (RRC Connection Setup) message, an RRC connection reject (RC Connection Reject) message, an RRC connection release (RRC Connection Release) message, a cell update confirm (Cell Update Confirm) message, a UTRAN registration area update confirm (URA Update Confirm) message, or a UTRAN mobility information (Utran Mobility Information) message.

For example, the user group information may be used to indicate subscription information of the UE, that is, the network device sets different user group information according to a priority of the subscription information of the UE. For example, a group identifier of a user group is 0, which indicates that a group in which UE is located is corresponding to a bronze user group on an RNC side; a group identifier of a user group is 1, which indicates that a group in which UE is located is corresponding to a silver user group on the RNC side; a group identifier of a user group is 2, which indicates that a group in which UE is located is corresponding to a gold user group on the RNC side, and a priority of users of each user group is that: a gold user>a silver user>a bronze user. On UE side, the UE only needs to know the group identifier of the user group in which the UE is located, and the user group information indicates a priority of the UE, which may implement different access control according to priorities of UEs to ensure that UE with a high priority preferentially uses a network resource.

It may be understood that if the access control parameter indicates that access of the gold user group is barred, access of the silver user group and the bronze user group is also barred; if the access control parameter indicates that the bronze user group is not barred, neither the gold user group nor the silver user group is barred.

In another implementation manner, the user group information may also be indicated by a non-access stratum of the UE to an access stratum of the UE.

According to the access control method in this embodiment, before generating an access control message that includes an access control parameter and range indication information, a network device indicates information about a user group in which UE is located to the UE, where the user group information may include a group identifier of the user group in which the UE is located; or the user group information includes an identifier of the UE in the user group and a group identifier of the user group, which may implement more precise and flexible access control of the network device over the UE, and may implement different access control according to priorities of UEs to ensure that UE with a high priority preferentially uses a network resource.

Figure 3:
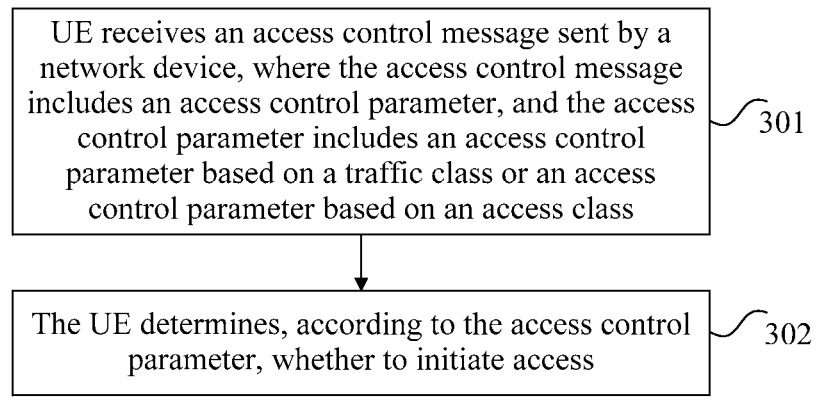
FIG. 3 is a flowchart of Embodiment 4 of an access control method according to the present invention.

FIG. 3 is a flowchart of Embodiment 4 of an access control method according to the present invention. As shown in FIG. 3, the access control method in this embodiment is described as follows:

S301. UE receives an access control message sent by a network device, where the access control message includes an access control parameter, and the access control parameter includes an access control parameter based on a traffic class or an access control parameter based on an access class.

The network device in this embodiment may be a device such as an evolved eNB or a home evolved HeNB in E-UTRAN, may be an RNC in UTRAN, may be a BSC in GERAN, or may be a part of the devices; the UE in this embodiment may include but is not limited to user equipment such as a mobile phone, a personal digital assistant (PDA for short), a wireless handheld device, a wireless netbook, and a portable computer, or some of the user equipment.

Optionally, the traffic class may include a first traffic class and/or a second traffic class, where the first traffic class may include at least one of the following traffic classes: conversational traffic, streaming traffic, interactive traffic, background traffic, high-priority signaling, and low-priority signaling; and the second traffic class includes signaling transmission traffic and/or data transmission traffic, or the second traffic class includes common traffic and/or dedicated traffic.

Further, the signaling transmission traffic includes a CCCH traffic and/or a DCCH traffic;

the data transmission traffic includes a DTCH traffic; the common traffic includes a CCCH traffic; the dedicated traffic includes a DCCH traffic and/or a DTCH traffic.

Optionally, the access control parameter based on a traffic class is a mapping relationship between the traffic class and an access indication, and the access indication is used to indicate whether access is allowed for the traffic class.

Optionally, the access control parameter based on a traffic class is a mapping relationship between a traffic class corresponding to an access class of the user equipment and an access indication, and the access indication is used to indicate whether access is allowed for the traffic class corresponding to the access class of the user equipment.

Optionally, the access control parameter based on a traffic class is a mapping relationship between an originating traffic class and a terminating traffic class that are corresponding to a traffic class, and an access indication, and the access indication is used to indicate whether access is allowed for the originating traffic class and the terminating traffic class.

Optionally, the access control parameter based on a traffic class is a mapping relationship between a first traffic class corresponding to the second traffic class and an access indication, and the access indication is used to indicate whether access is allowed for the first traffic class corresponding to the second traffic class.

Optionally, the access control parameter based on an access class is a mapping relationship between an access class group of the user equipment and an access indication, and the access indication is used to indicate whether access is allowed for the access class group of the user equipment.

Optionally, the access control parameter based on an access class is a mapping relationship between an access class that is of user equipment and corresponding to an access class group and an access indication, and the access indication is used to indicate whether access is allowed for the access class of the user equipment.

In this embodiment, for descriptions of an access manner, a manner in which the UE determines a traffic class, the access control parameter based on a traffic class, and the access control parameter based on an access class, reference may be made to the embodiment shown in FIG. 1, and details are not described herein again.

S302. The UE determines, according to the access control parameter, whether to initiate access.

Optionally, the access control message may include a broadcast message, a radio resource control RRC message, a paging message, and a system message change indication.

In this embodiment, for descriptions of the broadcast message, the radio resource control RRC message, the paging message, or the system message change indication, reference may be made to the embodiment shown in FIG. 1, and details are not described herein again.

It should be noted that an update of the access control message in this embodiment is different from an update of the access control parameter in the prior art. In the prior art, access control is performed on the UE by using ACB of the SIB3, and when there is traffic congestion, to ensure that UE of each access class may fairly share system resources, the access control parameter in the SIB3 needs to be frequently updated; each time the SIB3 is updated, the UE needs to be first notified, by using a paging type 1 or a system message change indication, that the SIB3 is updated, and in this way, when a network is congested, a burden on the network may be further aggravated instead. However, the access control message in this embodiment is used to instruct the UE to directly initiate access according to the access control parameter after receiving the access control message, and if the access control message in this embodiment is updated, the UE does not need to be notified, by using a paging type 1 or a system message change indication, that a SIB3 is updated, which may reduce a signaling burden on the network.

In this embodiment, for the access control parameter based on an access class, if the UE receives the access control parameter based on an access class in the present invention, an access control parameter in a system information block SIB3 in the prior art is ignored, and if the access control parameter based on an access class in this embodiment does not exist, the UE determines, according to the access control parameter in the SIB3 in the prior art, whether to initiate access.

In this embodiment, for the access control parameter based on a traffic class, the UE may determine, only according to an access control parameter that is based on a traffic class and corresponding to an originating traffic class/a terminating traffic class initiated by the UE, whether access is allowed for the UE. That is, when the access control parameter based on a traffic class exists, the access control parameter in the SIB3 in the prior art is ignored, and when the access control parameter based on a traffic class does not exist, the UE determines, according to the access control parameter in the SIB3, whether to initiate access.

Optionally, the UE may first determine, according to the access control parameter in the SIB3, whether access is allowed for an access class corresponding to the UE; if the access is allowed, then further determine whether an access indication corresponding to originating/terminating conversational traffic, streaming traffic, interactive traffic, background traffic, high-priority signaling, low-priority signaling, a DCCH, a DTCH, or the like to be initiated by the UE is not barred, and if the access indication corresponding to the originating/terminating conversational traffic, the streaming traffic, the interactive traffic, the background traffic, the high-priority signaling, the low-priority signaling, the DCCH, the DTCH, or the like to be initiated by the UE is not barred, initiate access; and if the access of the access class corresponding to the UE is not allowed, the UE no longer further performs determining on the access control parameter based on a traffic class and does not initiate access.

Alternatively, if access is not allowed for the access class corresponding to the UE, the UE then further determines whether originating/terminating conversational traffic, streaming traffic, interactive traffic, background traffic, high-priority signaling, low-priority signaling, or the like to be initiated by the UE is not barred, and if the originating/terminating conversational traffic, the streaming traffic, the interactive traffic, the background traffic, the high-priority signaling, the low-priority signaling, or the like to be initiated by the UE is not barred, initiates access; and if the access is allowed for the access class corresponding to the UE, the UE initiates access and does not need to further determine the access control parameter based on a traffic class.

In this embodiment, for the access control parameter based on a traffic class, precise access control is performed on the existing access control parameter according to a traffic class; further, on a basis of traffic classes of a CS domain and a PS domain, access control parameters based on originating/terminating conversational traffic, streaming traffic, interactive traffic, background traffic, high-priority signaling, low-priority signaling, a DCCH, and a DTCH may further be configured; for the access control parameter based on an access class, access classes are grouped on a basis of the prior art, and an access control parameter is configured for each group, which may enable the network device to provide more precise and flexible control of the UE, and implement different access control according to traffic classes of UEs to ensure that traffic with a high priority preferentially uses a network resource.

According to the access control method in this embodiment, UE receives an access control message sent by a network device, where the access control message includes an access control parameter, and the access control parameter includes an access control parameter based on a traffic class or an access control parameter based on an access class; and then determines, according to the access control parameter, whether to initiate access; and if the access control message in this embodiment is updated, the UE does not need to be notified, by using a paging type 1 or a system message change indication, that a SIB3 is updated, which may reduce a signaling burden on a network and may enable the network device to provide more precise and flexible control of the UE.

Figure 4:
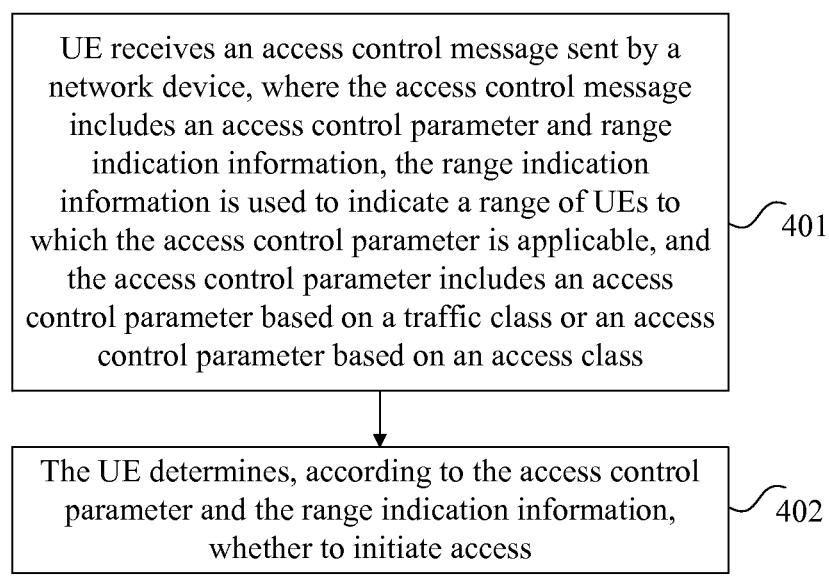
FIG. 4 is a flowchart of Embodiment 5 of an access control method according to the present invention.

FIG. 4 is a flowchart of Embodiment 5 of an access control method according to the present invention. As shown in FIG. 4, in the access control method in this embodiment, on a basis of the embodiment shown in FIG. 3, UE further receives range indication information that is sent by a network device and that indicates a range to which an access control parameter is applicable.

S401. The UE receives an access control message sent by the network device, where the access control message includes the access control parameter and the range indication information, the range indication information is used to indicate a range of UEs to which the access control parameter is applicable, and the access control parameter includes an access control parameter based on a traffic class or an access control parameter based on an access class.

S402. The UE determines, according to the access control parameter and the range indication information, whether to initiate access.

It should be noted that the range indication information of the access control parameter based on a traffic class may be that one traffic class is corresponding to one piece of range indication information, or may be that all traffic classes share one piece of range indication information.

According to the access control method in this embodiment, UE receives an access control message sent by a network device, where the access control message includes an access control parameter and range indication information, the range indication information is used to indicate a range of UEs to which the access control parameter is applicable, and the access control parameter includes an access control parameter based on a traffic class or an access control parameter based on an access class; and then determines, according to the access control parameter and the range indication information, whether to initiate access; and if the access control message in this embodiment is updated, the UE does not need to be notified, by using a paging type 1 or a system message change indication, that a SIB3 is updated, which may reduce a signaling burden on a network, and by means of indicating the range indication information in this embodiment, more precise and flexible access control of the network device over the UE may be implemented.

In another possible implementation manner, an SIB3 in the prior art may be extended, and an extended SIB3 carries the range indication information on a basis of the SIB3 in the prior art. For UE that can identify the range indication information, when a value tag of the SIB3 changes, the UE reads the SIB3, and determines, according to whether the UE belongs to a group identifier indicated by the range indication information, whether the UE needs to update a stored access control parameter; for UE that cannot identify the range indication information, when a value tag of the SIB3 changes or a storage time of the SIB3 expires, the UE reads and updates the stored access control parameter, and the access control parameter and the range indication information are indicated to the UE by using the extended SIB3, which may implement more precise and flexible access control of the network device over the UE.

Figure 5:
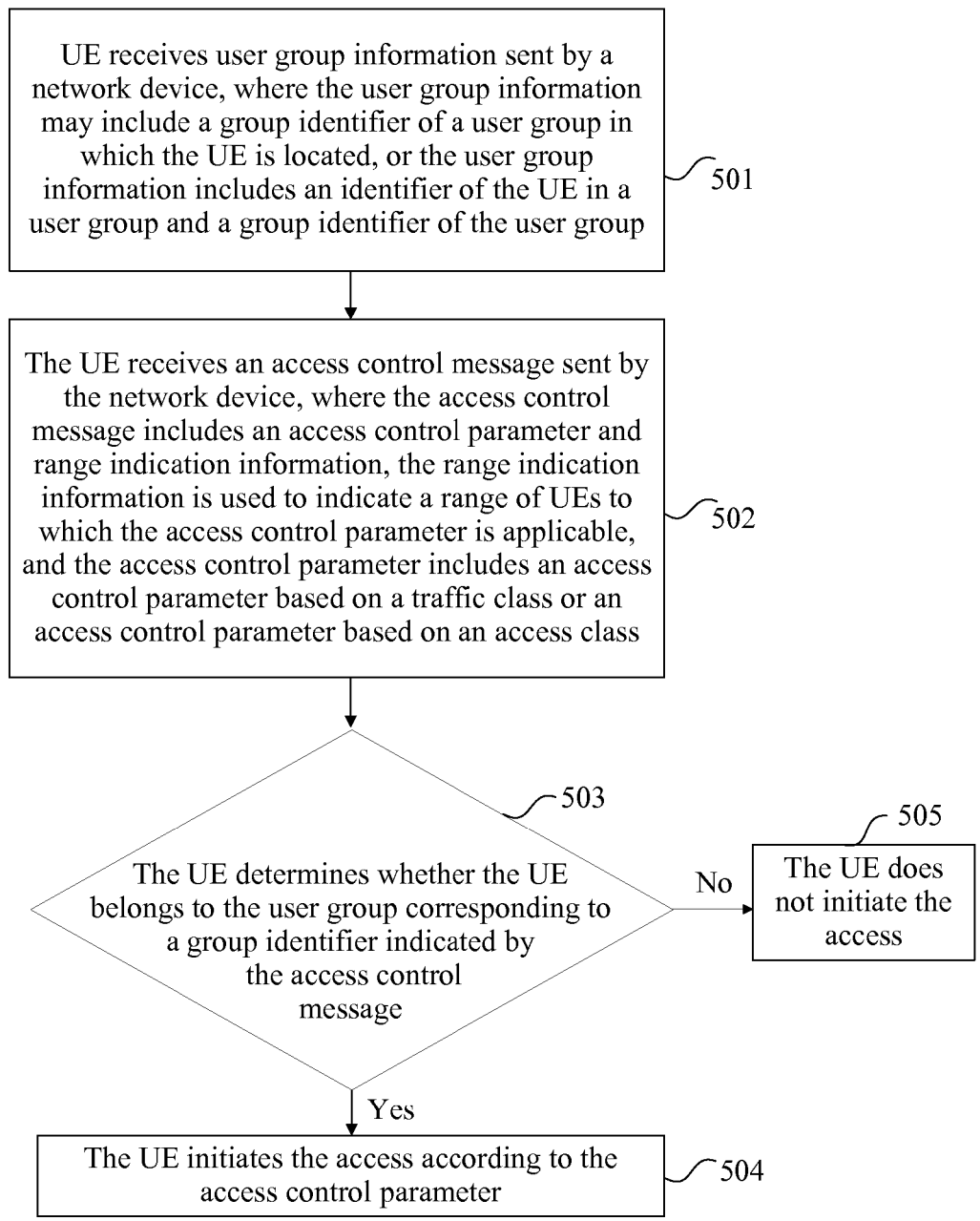
FIG. 5 is a flowchart of Embodiment 6 of an access control method according to the present invention.

FIG. 5 is a flowchart of Embodiment 6 of an access control method according to the present invention. As shown in FIG. 5, in the access control method in this embodiment, range indication information may be a group identifier of a user group in which UE is located, and the UE needs to receive user group information sent by a network device.

S501. The UE receives the user group information sent by the network device, where the user group information may include the group identifier of the user group in which the UE is located, or the user group information includes an identifier of the UE in the user group and the group identifier of the user group.

For example, the range indication information may be the group identifier of the user group in which the UE is located, that is, users are grouped to indicate a group to which an access control parameter is applicable.

The range indication information may indicate that the access control parameter is applicable to only UE whose group identifier is corresponding to a value of the range indication information. For example a value 0 indicates that the access control parameter is applicable to only UE in group 0, a value 1 indicates being applicable to UE in group 1, and a value 2 indicates being applicable to UE in group 2. The range indication information may further indicate that the access control parameter is applicable to UE whose group identifier is corresponding to a value of the range indication information and UE whose group identifier priority is lower than or higher than a priority of a group identifier indicated by the range indication information. For example, a value 0 indicates that the access control parameter is applicable to only UE in group 0, a value 1 indicates that the access control parameter is applicable to only UEs in group 0 and group 1, and a value 2 indicates that the access control parameter is applicable to only UEs in group 0, group 1, and group 2.

Specifically, the UE may receive the user group information carried in a radio resource control message such as an RRC Connection Setup message, an RRC Connection Reject message, an RRC Connection Release message, a Cell Update Confirm message, a URA Update Confirm message, or a Utran Mobility Information message.

It may be understood that in another implementation manner, the user group information may be indicated by a non-access stratum of the UE to an access stratum of the UE.

S502. The UE receives an access control message sent by the network device, where the access control message includes an access control parameter and range indication information, the range indication information is used to indicate a range of UEs to which the access control parameter is applicable, and the access control parameter includes an access control parameter based on a traffic class or an access control parameter based on an access class.

S503. The UE determines whether the UE belongs to the user group corresponding to a group identifier indicated by the access control message; if the UE belongs to the user group corresponding to the group identifier indicated by the access control message, S504 is performed; and if the UE does not belong to the user group corresponding to the group identifier indicated by the access control message, S505 is performed.

S504. The UE initiates access according to the access control parameter.

S505. The UE does not initiate the access.

The UE determines whether the UE belongs to the user group corresponding to a group identifier indicated by the range indication information; if the UE belongs to the user group corresponding to the group identifier indicated by the range indication information, the UE receives and updates a stored access control parameter; and if the UE does not belong to the user group corresponding to the group identifier indicated by the range indication information, the UE does not update the stored access control parameter.

In this embodiment, for the access control parameter based on an access class, if the UE receives the access control parameter based on an access class in the present disclosure and the UE belongs to the user group corresponding to the group identifier indicated by the range indication information, the UE ignores an access control parameter in the SIB3 in the prior art, and determines, only according to the access control parameter based on an access class in the present invention, whether to initiate access; and if the access control parameter based on an access class in this embodiment does not exist, the UE determines, according to the access control parameter in the SIB3 in the prior art, whether to initiate access.

In this embodiment, for the access control parameter based on a traffic class, if the UE belongs to the user group corresponding to the group identifier indicated by the range indication information, the UE may determine, only according to an access control parameter that is based on a traffic class in the present disclosure and corresponding to a traffic class initiated by the UE, whether to initiate access.

The UE may further first determine, according to the access control parameter in a SIB3, whether access of an access class corresponding to traffic initiated by the UE is permitted; and if the access is allowed, then further determine whether an access control parameter that is based on a traffic class in the present disclosure and corresponding to conversational traffic, streaming traffic, interactive traffic, background traffic, high-priority signaling, low-priority signaling, or the like to be initiated by the UE is not barred, and if the access control parameter that is based on the traffic class in the present disclosure and corresponding to the conversational traffic, the streaming traffic, the interactive traffic, the background traffic, the high-priority signaling, the low-priority signaling, or the like to be initiated by the UE is not barred, initiate access; or if the access is not allowed, then further determine whether the conversational traffic, the streaming traffic, the interactive traffic, the background traffic, the high-priority signaling, the low-priority signaling, or the like to be initiated by the UE is not barred, and if the conversational traffic, the streaming traffic, the interactive traffic, the background traffic, the high-priority signaling, the low-priority signaling, or the like to be initiated by the UE is not barred, initiate access.

According to the access control method in this embodiment, before receiving an access control message sent by a network device, UE receives user group information sent by the network device, where the user group information may include a group identifier of a user group in which the UE is located; or the user group information includes an identifier of the UE in a user group and a group identifier of the user group; the UE determines whether the UE belongs to the user group corresponding to a group identifier indicated by the access control message, and if the UE belongs to the user group corresponding to the group identifier indicated by the access control message, initiates access according to the access control parameter, which may implement more precise and flexible access control of the network device over the UE, and may implement different access control according to priorities of UEs to ensure that UE with a high priority preferentially uses a network resource.

Figure 6:
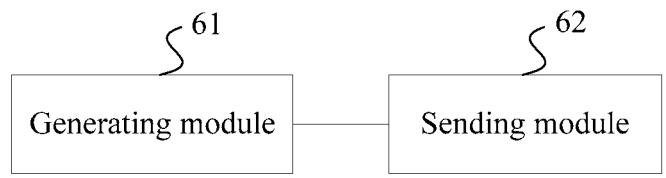
FIG. 6 is a schematic structural diagram of Embodiment 1 of an access control apparatus according to the present invention.

FIG. 6 is a schematic structural diagram of Embodiment 1 of an access control apparatus according to the present invention. As shown in FIG. 6, the access control apparatus in this embodiment includes: a generating module 61 and a sending module 62, where the generating module 61 is configured to generate an access control message that includes an access control parameter, where the access control message is used to instruct UE to determine, according to the access control parameter after receiving the access control message, whether to initiate access, and the access control parameter includes an access control parameter based on a traffic class or an access control parameter based on an access class; and the sending module 62 is configured to send the access control message to the UE.

Optionally, the traffic class may include a first traffic class and/or a second traffic class, where the first traffic class may include at least one of the following traffic classes: conversational traffic, streaming traffic, interactive traffic, background traffic, high-priority signaling, and low-priority signaling; and the second traffic class includes signaling transmission traffic and/or data transmission traffic, or the second traffic class includes common traffic and/or dedicated traffic.

Further, the signaling transmission traffic includes a CCCH traffic and/or a DCCH traffic; the data transmission traffic includes a DTCH traffic; the common traffic includes a CCCH traffic; the dedicated traffic includes a DCCH traffic and/or a DTCH traffic.

Optionally, the access control parameter based on a traffic class is a mapping relationship between the traffic class and an access indication, and the access indication is used to indicate whether access is allowed for the traffic class.

Optionally, the access control parameter based on a traffic class is a mapping relationship between a traffic class corresponding to an access class of the user equipment and an access indication, and the access indication is used to indicate whether access is allowed for the traffic class corresponding to the access class of the user equipment.

Optionally, the access control parameter based on a traffic class is a mapping relationship between an originating traffic class and a terminating traffic class that are corresponding to a traffic class, and an access indication, and the access indication is used to indicate whether access is allowed for the originating traffic class and the terminating traffic class.

Optionally, the access control parameter based on a traffic class is a mapping relationship between a first traffic class corresponding to the second traffic class and an access indication, and the access indication is used to indicate whether access is allowed for the first traffic class corresponding to the second traffic class.

It may be understood that the access control parameter based on a traffic class may also be a mapping relationship between the second traffic class corresponding to the first traffic class and an access indication, and the access indication is used to indicate whether access is allowed for the second traffic class corresponding to the first traffic class.

Optionally, the access control parameter based on an access class is a mapping relationship between an access class group of the user equipment and an access indication, and the access indication is used to indicate whether access is allowed for the access class group of the user equipment.

Optionally, the access control parameter based on an access class is a mapping relationship between an access class that is of user equipment and corresponding to an access class group and an access indication, and the access indication is used to indicate whether access is allowed for the access class of the user equipment.

In this embodiment, for descriptions of an access manner, a manner in which the UE determines a traffic class, the access control parameter based on a traffic class, and the access control parameter based on an access class, reference may be made to the embodiment shown in FIG. 1, and details are not described herein again.

Further, the generating module 61 is further configured to generate an access control message that includes an access control parameter and range indication information, where the access control message is used to instruct UE indicated by the range indication information to determine, according to the access control parameter after receiving the access control message, whether to initiate access.

Still further, the range indication information is a group identifier of a user group in which the UE is located.

The sending module 62 is further configured to: before sending the access control message to the UE, send user group information to the UE, where the user group information includes the group identifier of the user group in which the UE is located, or the user group information includes an identifier of the UE in the user group and the group identifier of the user group.

Optionally, the access control message includes any one of: a broadcast message, a radio resource control RRC message, a paging message, and a system message change indication.

The network device in this embodiment may be a device such as an evolved eNB or a home evolved HeNB in E-UTRAN, may be an RNC in UTRAN, may be a BSC in GERAN, or may be a part of the devices.

The apparatus in this embodiment may be configured to execute the technical solution in the embodiment of the method shown in FIG. 1, FIG. 2 or Embodiment 3 of the access control method provided in the present invention, and implementation principles and technical effects of the apparatus are similar and are not described herein again.

Figure 7:
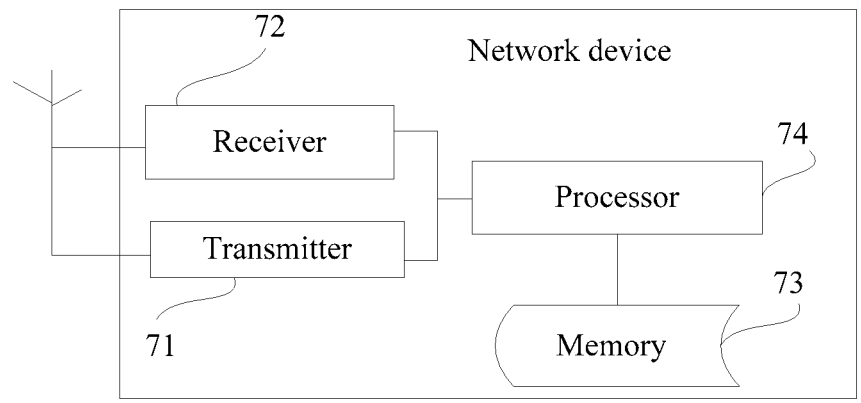
FIG. 7 is a schematic structural diagram of Embodiment 2 of an access control apparatus according to the present invention.

FIG. 7 is a schematic structural diagram of Embodiment 2 of an access control apparatus according to the present invention. As shown in FIG. 7, the access control apparatus in this embodiment may be a network device, and the network device includes a transmitter 71, a receiver 72, a memory 73, and a processor 74 that is separately connected to the transmitter 71, the receiver 72, and the memory 73. Certainly, the access control apparatus may further include general components, such as an antenna, a baseband processing component, an intermediate radio frequency processing component, and an input and output apparatus, and this embodiment of the present disclosure sets no limitation herein. The memory 73 stores a group of program code. The processor 74 is configured to generate an access control message that includes an access control parameter, where the access control message is used to instruct UE to determine, according to the access control parameter after receiving the access control message, whether to initiate access, and the access control parameter includes an access control parameter based on a traffic class or an access control parameter based on an access class. The transmitter 71 is configured to send the access control message to the UE.

Optionally, the traffic class may include a first traffic class and/or a second traffic class, where the first traffic class may include at least one of the following traffic classes: conversational traffic, streaming traffic, interactive traffic, background traffic, high-priority signaling, and low-priority signaling; and the second traffic class includes signaling transmission traffic and/or data transmission traffic, or the second traffic class includes common traffic and/or dedicated traffic.

Further, the signaling transmission traffic includes a CCCH traffic and/or a DCCH traffic; the data transmission traffic includes a DTCH traffic; the common traffic includes a CCCH traffic; the dedicated traffic includes a DCCH traffic and/or a DTCH traffic.

Optionally, the access control parameter based on a traffic class is a mapping relationship between the traffic class and an access indication, and the access indication is used to indicate whether access is allowed for the traffic class.

Optionally, the access control parameter based on a traffic class is a mapping relationship between a traffic class corresponding to an access class of the user equipment and an access indication, and the access indication is used to indicate whether access is allowed for the traffic class corresponding to the access class of the user equipment.

Optionally, the access control parameter based on a traffic class is a mapping relationship between an originating traffic class and a terminating traffic class that are corresponding to a traffic class, and an access indication, and the access indication is used to indicate whether access is allowed for the originating traffic class and the terminating traffic class.

Optionally, the access control parameter based on a traffic class is a mapping relationship between a first traffic class corresponding to the second traffic class and an access indication, and the access indication is used to indicate whether access is allowed for the first traffic class corresponding to the second traffic class.

It may be understood that the access control parameter based on a traffic class may also be a mapping relationship between the second traffic class corresponding to the first traffic class and an access indication, and the access indication is used to indicate whether access is allowed for the second traffic class corresponding to the first traffic class.

Optionally, the access control parameter based on an access class is a mapping relationship between an access class group of the user equipment and an access indication, and the access indication is used to indicate whether access is allowed for the access class group of the user equipment.

Optionally, the access control parameter based on an access class is a mapping relationship between an access class that is of user equipment and corresponding to an access class group and an access indication, and the access indication is used to indicate whether access is allowed for the access class of the user equipment.

In this embodiment, for descriptions of an access manner, a manner in which the UE determines a traffic class, the access control parameter based on a traffic class, and the access control parameter based on an access class, reference may be made to the embodiment shown in FIG. 1, and details are not described herein again.

Further, the processor 74 is further configured to generate an access control message that includes an access control parameter and range indication information, where the access control message is used to instruct UE indicated by the range indication information to determine, according to the access control parameter after receiving the access control message, whether to initiate access.

Further, the range indication information is a group identifier of a user group in which the UE is located. The transmitter 71 is further configured to: before sending the access control message to the UE, send user group information to the UE, where the user group information includes the group identifier of the user group in which the UE is located, or the user group information includes an identifier of the UE in the user group and the group identifier of the user group.

Further, the access control message includes any one of: a broadcast message, a radio resource control RRC message, a paging message, and a system message change indication.

In this embodiment, for descriptions of the broadcast message, the radio resource control RRC message, the paging message, or the system message change indication, reference may be made to the embodiment shown in FIG. 1, and details are not described herein again.

The network device in this embodiment may be configured to execute the technical solution in the embodiment of the method shown in FIG. 1, FIG. 2, or Embodiment 3 of the access control method provided in the present invention, and implementation principles and technical effects of the network device are similar and are not described herein again.

Figure 8:
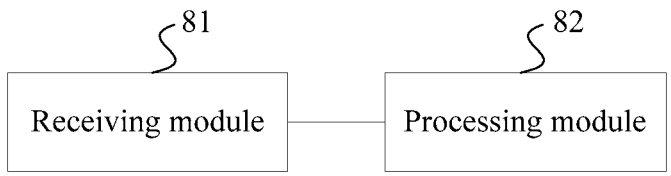
FIG. 8 is a schematic structural diagram of Embodiment 3 of an access control apparatus according to the present invention.

FIG. 8 is a schematic structural diagram of Embodiment 3 of an access control apparatus according to the present invention. As shown in FIG. 8, the access control apparatus in this embodiment includes a receiving module 81 and a processing module 82, where the receiving module 81 is configured to receive an access control message sent by a network device, where the access control message includes an access control parameter, and the access control parameter includes an access control parameter based on a traffic class or an access control parameter based on an access class; and the processing module 82 is configured to determine, according to the access control parameter, whether to initiate access.

Optionally, the traffic class may include a first traffic class and/or a second traffic class, where the first traffic class may include at least one of the following traffic classes: conversational traffic, streaming traffic, interactive traffic, background traffic, high-priority signaling, and low-priority signaling; and the second traffic class includes signaling transmission traffic and/or data transmission traffic, or the second traffic class includes common traffic and/or dedicated traffic.

Further, the signaling transmission traffic includes a CCCH traffic and/or a DCCH traffic; the data transmission traffic includes a DTCH traffic; the common traffic includes a CCCH traffic; the dedicated traffic includes a DCCH traffic and/or a DTCH traffic.

Optionally, the access control parameter based on a traffic class is a mapping relationship between the traffic class and an access indication, and the access indication is used to indicate whether access is allowed for the traffic class.

Optionally, the access control parameter based on a traffic class is a mapping relationship between a traffic class corresponding to an access class of the user equipment and an access indication, and the access indication is used to indicate whether access is allowed for the traffic class corresponding to the access class of the user equipment.

Optionally, the access control parameter based on a traffic class is a mapping relationship between an originating traffic class and a terminating traffic class that are corresponding to a traffic class, and an access indication, and the access indication is used to indicate whether access is allowed for the originating traffic class and the terminating traffic class.

Optionally, the access control parameter based on a traffic class is a mapping relationship between a first traffic class corresponding to the second traffic class and an access indication, and the access indication is used to indicate whether access is allowed for the first traffic class corresponding to the second traffic class.

It may be understood that the access control parameter based on a traffic class may also be a mapping relationship between the second traffic class corresponding to the first traffic class and an access indication, and the access indication is used to indicate whether access is allowed for the second traffic class corresponding to the first traffic class.

Optionally, the access control parameter based on an access class is a mapping relationship between an access class group of the user equipment and an access indication, and the access indication is used to indicate whether access is allowed for the access class group of the user equipment.

Optionally, the access control parameter based on an access class is a mapping relationship between an access class that is of user equipment and corresponding to an access class group and an access indication, and the access indication is used to indicate whether access is allowed for the access class of the user equipment.

In this embodiment, for descriptions of an access manner, a manner in which the UE determines a traffic class, the access control parameter based on a traffic class, and the access control parameter based on an access class, reference may be made to the embodiment shown in FIG. 1, and details are not described herein again.

Further, the access control message further includes range indication information, and the range indication information is used to indicate a range of UEs to which the access control parameter is applicable.

The processing module 82 is further configured to determine, according to the access control parameter and the range indication information, whether to initiate access.

Still further, the range indication information is a group identifier of a user group in which the UE is located.

The receiving module 81 is further configured to: before receiving the access control message sent by the network device, receive user group information sent by the network device, where the user group information includes the group identifier of the user group in which the UE is located, or the user group information includes an identifier of the UE in the user group and the group identifier of the user group.

The processing module 82 is further configured to: determine, whether the UE belongs to the user group corresponding to a group identifier indicated by the access control message; and if the UE belongs to the user group corresponding to the group identifier indicated by the access control message, the UE initiates access according to the access control parameter.

Optionally, the access control message includes any one of: a broadcast message, a radio resource control RRC message, a paging message, and a system message change indication.

In this embodiment, for descriptions of the broadcast message, the radio resource control RRC message, the paging message, or the system message change indication, reference may be made to the embodiment shown in FIG. 1, and details are not described herein again.

The apparatus in this embodiment may be configured to execute the technical solution in the embodiment of the method shown in FIG. 3, FIG. 4, or FIG. 5, and implementation principles and technical effects of the apparatus are similar and are not described herein again.

Figure 9:
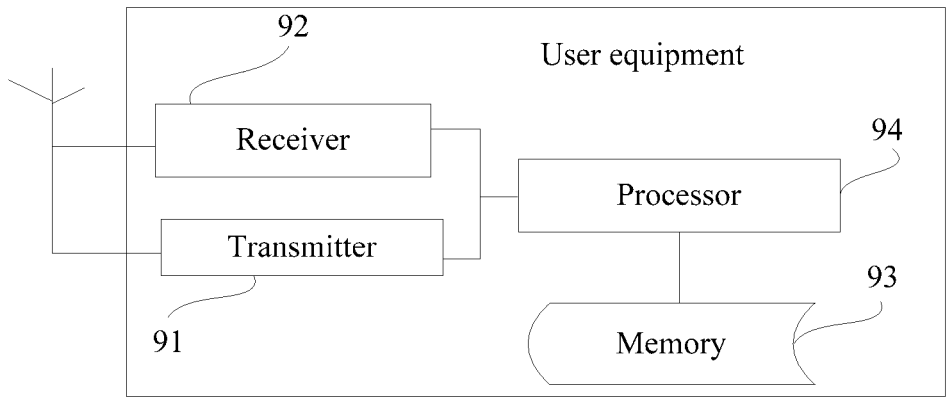
FIG. 9 is a schematic structural diagram of Embodiment 4 of an access control apparatus according to the present invention.

FIG. 9 is a schematic structural diagram of Embodiment 4 of an access control apparatus according to the present invention. As shown in FIG. 9, the access control apparatus in this embodiment may be a UE, and the UE includes a transmitter 91, a receiver 92, a memory 93, and a processor 94 that is separately connected to the transmitter 91, the receiver 92, and the memory 93. Certainly, the access control apparatus may further include general components, such as an antenna, a baseband processing component, an intermediate radio frequency processing component, and an input and output apparatus, and this embodiment of the present disclosure sets no limitation herein. The memory 93 stores a group of program code. The receiver 92 is configured to receive an access control message sent by a network device, where the access control message includes an access control parameter, and the access control parameter includes an access control parameter based on a traffic class or an access control parameter based on an access class. The processor 94 is configured to determine, according to the access control parameter, whether to initiate access.

Optionally, the traffic class may include a first traffic class and/or a second traffic class, where the first traffic class may include at least one of the following traffic classes: conversational traffic, streaming traffic, interactive traffic, background traffic, high-priority signaling, and low-priority signaling; and the second traffic class includes signaling transmission traffic and/or data transmission traffic, or the second traffic class includes common traffic and/or dedicated traffic.

Further, the signaling transmission traffic includes a CCCH traffic and/or a DCCH traffic; the data transmission traffic includes a DTCH traffic; the common traffic includes a CCCH traffic; the dedicated traffic includes a DCCH traffic and/or a DTCH traffic.

Optionally, the access control parameter based on a traffic class is a mapping relationship between the traffic class and an access indication, and the access indication is used to indicate whether access is allowed for the traffic class.

Optionally, the access control parameter based on a traffic class is a mapping relationship between a traffic class corresponding to an access class of the user equipment and an access indication, and the access indication is used to indicate whether access is allowed for the traffic class corresponding to the access class of the user equipment.

Optionally, the access control parameter based on a traffic class is a mapping relationship between an originating traffic class and a terminating traffic class that are corresponding to a traffic class, and an access indication, and the access indication is used to indicate whether access is allowed for the originating traffic class and the terminating traffic class.

Optionally, the access control parameter based on a traffic class is a mapping relationship between a first traffic class corresponding to the second traffic class and an access indication, and the access indication is used to indicate whether access is allowed for the first traffic class corresponding to the second traffic class.

It may be understood that the access control parameter based on a traffic class may also be a mapping relationship between the second traffic class corresponding to the first traffic class and an access indication, and the access indication is used to indicate whether access is allowed for the second traffic class corresponding to the first traffic class.

Optionally, the access control parameter based on an access class is a mapping relationship between an access class group of the user equipment and an access indication, and the access indication is used to indicate whether access is allowed for the access class group of the user equipment.

Optionally, the access control parameter based on an access class is a mapping relationship between an access class that is of user equipment and corresponding to an access class group and an access indication, and the access indication is used to indicate whether access is allowed for the access class of the user equipment.

In this embodiment, for descriptions of an access manner, a manner in which the UE determines a traffic class, the access control parameter based on a traffic class, and the access control parameter based on an access class, reference may be made to the embodiment shown in FIG. 1, and details are not described herein again.

Further, the access control message further includes range indication information, and the range indication information is used to indicate a range of UEs to which the access control parameter is applicable.

The processor 94 is further configured to determine, according to the access control parameter and the range indication information, whether to initiate access.

Further, the range indication information is a group identifier of a user group in which the UE is located. The receiver 92 is further configured to: before receiving the access control message sent by the network device, receive user group information sent by the network device, where the user group information includes the group identifier of the user group in which the UE is located, or the user group information includes an identifier of the UE in the user group and the group identifier of the user group.

The processor 94 is further configured to:

determine, whether the UE belongs to the user group corresponding to a group identifier indicated by the access control message; and if the UE belongs to the user group corresponding to the group identifier indicated by the access control message, initiate access according to the access control parameter.

Further, the access control message includes any one of: a broadcast message, a radio resource control RRC message, a paging message, and a system message change indication.

In this embodiment, for descriptions of the broadcast message, the radio resource control RRC message, the paging message, or the system message change indication, reference may be made to the embodiment shown in FIG. 1, and details are not described herein again.

The UE in this embodiment may include but is not limited to user equipment such as a mobile phone, a personal digital assistant (PDA for short), a wireless handheld device, a wireless netbook, and a portable computer, or some of the user equipment.

The user equipment in this embodiment may be configured to execute the technical solution in the embodiment of the method shown in FIG. 3, FIG. 4, or FIG. 5, and implementation principles and technical effects of the user equipment are similar and are not described herein again.

It should be noted that the schematic structural diagrams corresponding to the foregoing embodiments are only exemplary, and connection relationships between parts or modules are not limited to the form shown in the figures, and may be subject to a situation in an actual application.

In the several embodiments provided in the present invention, it should be understood that the disclosed apparatus and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) or a processor to perform some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

It may be clearly understood by a person skilled in the art that, for the purpose of convenient and brief description, division of the foregoing functional modules is taken as an example for illustration. In actual application, the foregoing functions can be allocated to different functional modules and implemented according to a requirement, that is, an inner structure of an apparatus is divided into different functional modules to implement all or some of the functions described above. For a detailed working process of the foregoing apparatus, reference may be made to a corresponding process in the foregoing method embodiments, and details are not described herein again.

Finally, it should be noted that the foregoing embodiments are merely intended for describing the technical solutions of the present invention, but not for limiting the present invention. Although the present disclosure is described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. An access control method comprising:
   receiving, by a user equipment (UE), an access control message sent by a network device, wherein the access control message comprises
   a) range indication information, and
   b) a mapping relationship between a traffic class and an access indication,
   where the access indication indicates whether access is allowed for the traffic class and the range indication information indicates a range of UEs to which the mapping relationship is applicable; and
   determining, by the UE, according to the mapping relationship and the range indication information, whether to initiate access to a traffic corresponding to the traffic class.

2. The method according to claim 1, wherein the traffic class comprises a dedicated traffic.

3. The method according to claim 2, wherein the dedicated traffic comprises a dedicated traffic channel (DTCH) traffic.

4. The method according to claim 1, wherein the range indication information is a group identifier of a user group in which the UE is located; and
   wherein before receiving the access control message sent by the network device, the method further comprises:
   receiving, by the UE, user group information sent by the network device, wherein the user group information comprises a group identifier of the user group in which the UE is located, or the user group information comprises an identifier of the UE in the user group and the group identifier of the user group; and
   determining whether to initiate access to the traffic corresponding to the traffic class comprises:
   a) determining, by the UE, whether the UE belongs to the user group associated with the group identifier indicated by the access control message; and
   b) when the UE belongs to the user group associated with the group identifier indicated by the access control message, initiating, by the UE, access to a traffic corresponding to the traffic class according to the mapping relationship.

5. The method according to claim 1, wherein the access control message comprises any one of: a broadcast message, a radio resource control (RRC) message, a paging message, and a system message change indication.

6. A user equipment (UE) comprising:
a receiver configured to receive an access control message sent by a network device, wherein the access control message comprises
   a) range indication information, and
   b) a mapping relationship between a traffic class and an access indication,
where the access indication indicates whether access is allowed for the traffic class and the range indication information indicates a range of UEs to which the mapping relationship is applicable; and
a processor configured to determine, according to the mapping relationship and the range indication information, whether to initiate access to a traffic corresponding to the traffic class.

7. The UE according to claim 6, wherein the traffic class comprises dedicated traffic.

8. The UE according to claim 7, wherein the dedicated traffic comprises a dedicated traffic channel (DTCH) traffic.

9. The UE according to claim 6, wherein the range indication information is a group identifier of a user group in which the UE is located; and
wherein the receiver is further configured to, before receiving the access control message sent by the network device, receive user group information sent by the network device, wherein the user group information comprises the group identifier of the user group in which the UE is located, or the user group information comprises an identifier of the UE in the user group and the group identifier of the user group; and
the processor is further configured to determine (a) whether the UE belongs to the user group associated with the group identifier indicated by the access control message, and (b) when the UE belongs to the user group associated with the group identifier indicated by the access control message, initiate access to a traffic corresponding to the traffic class according to the mapping relationship.

10. The UE according to claim 6, wherein the access control message comprises any one of: a broadcast message, a radio resource control (RRC) message, a paging message, and a system message change indication.

11. A network device comprising:
a processor configured to generate an access control message comprising range indication information, and a mapping relationship between a traffic class and an access indication, wherein the access indication indicates whether access is allowed for the traffic class and the access control message is intended to instruct user equipment (UE) indicated by the range indication information to determine, according to the mapping relationship, whether to initiate access to a traffic corresponding to the traffic class; and a transmitter configured to send the access control message to the UE.

12. The network device according to claim 11, wherein the traffic class comprising dedicated traffic.

13. The network device according to claim 12, wherein the dedicated traffic comprises a dedicated traffic channel (DTCH) traffic.

14. The network device according to claim 11, wherein the range indication information is a group identifier of a user group in which the UE is located; and
the transmitter is further configured to, before sending the access control message to the UE, send user group information to the UE,
wherein the user group information comprises the group identifier of the user group in which the UE is located, or the user group information comprises an identifier of the UE in the user group and the group identifier of the user group.

15. An apparatus comprising a non-transitory memory storing instructions, the instructions being executable by a processor to:
obtain an access control message from a network device, wherein the access control message comprises
   a) range indication information, and
   b) a mapping relationship between a traffic class and an access indication,
wherein the access indication indicates whether access is allowed for the traffic class and the range indication information indicates a range of user terminals (UEs) to which the mapping relationship is applicable; and
determine, according to the mapping relationship and the range indication information, whether to initiate access to a traffic corresponding to the traffic class.

16. The apparatus according to claim 15, wherein the traffic class comprises dedicated traffic, wherein the dedicated traffic comprises a dedicated traffic channel (DTCH) traffic.

17. The apparatus according to claim 15, wherein the range indication information is a group identifier of a user group in which a UE is located; and
wherein the processor is further configured to,
   a) before obtaining the access control message from the network device, obtain user group information from the network device, wherein the user group information comprises the group identifier of the user group in which the UE is located, or the user group information comprises an identifier of the UE in the user group and the group identifier of the user group; and
   b) determine whether the UE belongs to the user group associated with the group identifier indicated by the access control message, and when the UE belongs to the user group associated with the group identifier indicated by the access control message, determine to initiate access to a traffic corresponding to the traffic class according to the mapping relationship.

18. The apparatus according to claim 15, wherein the access control message comprises any one of: a broadcast message, a radio resource control (RRC) message, a paging message, and a system message change indication.

* * * * *